US012236836B2

(12) United States Patent
Seo et al.

(10) Patent No.: US 12,236,836 B2
(45) Date of Patent: Feb. 25, 2025

(54) DISPLAY DEVICE COMPARING IMAGE DATA BETWEEN ADJACENT FRAMES AND DETERMINING FIRST AND SECOND AREAS TO DRIVE FIRST AND SECOND AREAS AT DIFFERENT REFRESH RATES AND DRIVING METHOD THEREOF

(71) Applicant: Samsung Display Co., Ltd., Yongin-si (KR)

(72) Inventors: Hae Kwan Seo, Yongin-si (KR); Jun Heyung Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/854,316

(22) Filed: Apr. 21, 2020

(65) Prior Publication Data

US 2021/0035488 A1 Feb. 4, 2021

(30) Foreign Application Priority Data

Jul. 29, 2019 (KR) ........................ 10-2019-0091913

(51) Int. Cl.
*G09G 3/20* (2006.01)

(52) U.S. Cl.
CPC ... *G09G 3/2092* (2013.01); *G09G 2310/0267* (2013.01); *G09G 2310/0278* (2013.01); *G09G 2370/08* (2013.01)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS 9,019,188 B2 4/2015 Han et al.
9,069,521 B2 6/2015 Lee et al.
(Continued)

FOREIGN PATENT DOCUMENTS

CN 101551985 A 10/2009
CN 103680382 A 3/2014
(Continued)

OTHER PUBLICATIONS

Korean Notice of Allowance dated May 28, 2024, issued in Korean Patent Application No. 10-2019-0091913, 8 pages.

*Primary Examiner* — Ke Xiao
*Assistant Examiner* — Nelson Lam
(74) *Attorney, Agent, or Firm* — Lewis Roca Rothgerber Christie LLP

(57) ABSTRACT

A display device includes: a pixel unit including a plurality of pixels connected to a plurality of scan lines and a plurality of data lines; a multi-frequency driver configured to compare image data between adjacent frames to determine a first area of the pixel unit driven at a first refresh rate and a second area of the pixel unit driven at a second refresh rate lower than the first refresh rate; a scan driver configured to sequentially supply scan signals to the scan lines in a first direction, to supply first scan signals of the scan signals to the first area at the first refresh rate, and to supply second scan signals of the scan signals to the second area at the second refresh rate; and a data driver configured to supply a data signal corresponding to the image data to the data lines.

15 Claims, 18 Drawing Sheets

(58) Field of Classification Search
CPC ...... G09G 3/3233; G09G 3/3241; G09G 3/36; G09G 3/3611; G09G 3/3618; G09G 3/3622; G09G 3/3625; G09G 3/3677; G09G 3/3681
USPC ........................................ 345/76–83, 87–104
See application file for complete search history.

(56) References Cited

U.S. PATENT DOCUMENTS

| | | | | |
|---|---|---|---|---|
| 9,613,554 | B2 | 4/2017 | Jang et al. | |
| 12,020,646 | B2 * | 6/2024 | Gu | G09G 3/3233 |
| 2006/0125765 | A1 * | 6/2006 | Hiyama | G09G 3/3659 345/98 |
| 2006/0139305 | A1 * | 6/2006 | Zhou | G09G 3/344 345/107 |
| 2007/0236603 | A1 * | 10/2007 | Itoh | G09G 5/006 348/441 |
| 2009/0109159 | A1 * | 4/2009 | Tsai | G09G 3/3611 345/98 |
| 2009/0251445 | A1 * | 10/2009 | Ito | G09G 3/3648 345/204 |
| 2012/0026147 | A1 * | 2/2012 | Komiya | G09G 3/3233 345/76 |
| 2012/0081345 | A1 * | 4/2012 | Yamauchi | G09G 3/3648 345/209 |
| 2013/0208189 | A1 * | 8/2013 | White | H04N 5/14 348/607 |
| 2013/0265294 | A1 * | 10/2013 | Kim | G09G 3/3611 345/214 |
| 2014/0085276 | A1 * | 3/2014 | Jang | G09G 3/2007 345/204 |
| 2014/0152533 | A1 * | 6/2014 | Imada | G09G 3/3648 345/89 |
| 2014/0306870 | A1 * | 10/2014 | Miyake | G02F 1/13624 345/90 |
| 2015/0170607 | A1 | 6/2015 | Shin | |
| 2015/0255043 | A1 * | 9/2015 | Miyake | G09G 3/3655 345/205 |
| 2015/0287372 | A1 * | 10/2015 | Suyama | G09G 3/3611 345/87 |
| 2016/0027393 | A1 * | 1/2016 | Yoshiga | G09G 3/3648 345/94 |
| 2016/0042707 | A1 * | 2/2016 | Wang | G09G 3/3266 345/214 |
| 2016/0042708 | A1 | 2/2016 | Wang et al. | |
| 2016/0063939 | A1 * | 3/2016 | Lee | G09G 3/3648 345/213 |
| 2016/0098962 | A1 * | 4/2016 | Shibazaki | G09G 3/3611 345/102 |
| 2016/0180762 | A1 * | 6/2016 | Bathiche | G06F 3/013 345/174 |
| 2016/0196802 | A1 * | 7/2016 | Nho | G09G 3/20 345/212 |
| 2018/0018927 | A1 * | 1/2018 | Amirkhany | G09G 5/006 |
| 2019/0043435 | A1 * | 2/2019 | Yang | G09G 3/3406 |
| 2021/0027715 | A1 * | 1/2021 | Kim | G09G 3/20 |

FOREIGN PATENT DOCUMENTS

| | | | |
|---|---|---|---|
| KR | 10-2014-0043633 | A | 4/2014 |
| KR | 10-2015-0059385 | A | 6/2015 |
| KR | 10-2015-0134485 | A | 12/2015 |
| KR | 10-2016-0045215 | A | 4/2016 |
| KR | 10-2016-0057028 | A | 5/2016 |
| KR | 10-1910111 | B1 | 10/2018 |
| KR | 10-1954934 | B1 | 3/2019 |

* cited by examiner

DISPLAY DEVICE COMPARING IMAGE DATA BETWEEN ADJACENT FRAMES AND DETERMINING FIRST AND SECOND AREAS TO DRIVE FIRST AND SECOND AREAS AT DIFFERENT REFRESH RATES AND DRIVING METHOD THEREOF

CROSS-REFERENCE TO RELATED APPLICATION

This application claims priority to and the benefit of Korean Patent Application No. 10-2019-0091913 filed in the Korean Intellectual Property Office on Jul. 29, 2019, the entire contents of which are incorporated herein by reference.

BACKGROUND

1. Field

Aspects of some example embodiments of the present invention relate to an electronic device, and for example, a display device included in the electronic device and a driving method thereof.

2. Description of the Related Art

A display device includes a display panel (or pixel unit) and a driver. The display panel generally includes scan lines, data lines, and pixels. The driver generally includes a scan driver for providing scan signals to scan lines and a data driver for providing data signals to data lines. Each pixel emits light with luminance corresponding to the data signal provided through the corresponding data line in response to the scan signal provided through the corresponding scan line.

The display device may display an image at a low frequency to reduce power consumption. For example, when the display device displays static images or ambient images (e.g., in the case of an always on display, an ambient display, etc.), it may display the images at a lower refresh rate than a refresh rate for displaying other categories of images (i.e., video, user's use image). Alternatively, only a portion of the display panel may be driven to reduce power consumption.

The above information disclosed in this Background section is only for enhancement of understanding of the background and therefore the information discussed in this Background section does not necessarily constitute prior art.

SUMMARY

Aspects of some example embodiments of the present invention include a display device that compares image data to determine a boundary between a first area and a second area of a pixel unit, and drives the second area at a lower frequency (e.g., refresh rate) than the first area.

Aspects of some example embodiments of the present invention include a driving method for the display device.

However, the characteristics of the present invention are not limited to the characteristics described above, but may be variously extended or modified without departing from the idea and scope of embodiments according to the present invention.

A display device according to some example embodiments of the present invention includes a pixel unit including a plurality of pixels connected to a plurality of scan lines and a plurality of data lines; a multi-frequency driver comparing image data between adjacent frames to determine a first area of the pixel unit driven at a first refresh rate and a second area of the pixel unit driven at a second refresh rate lower than the first refresh rate; a scan driver for sequentially supplying a scan signal to the scan lines in a first direction, supplying the scan signal to the first area at the first refresh rate, and supplying the scan signal to the second area at the second refresh rate; and a data driver for supplying a data signal corresponding to the image data to the data lines.

According to some example embodiments, the multi-frequency driver may determine a boundary pixel row, which is a top pixel row of the second area, based on results of comparing the image data during a plurality of frames.

According to some example embodiments, the scan driver may supply the scan signal from the boundary pixel row to a last pixel row at the second refresh rate.

According to some example embodiments, when a video is displayed on a portion of the pixel unit, the multi-frequency driver may gradually increase a size of an area driven at the second refresh rate in a second direction opposite to the first direction during a search period for determining the boundary pixel row.

According to some example embodiments, the scan driver may gradually increase a number of the scan lines driven at the second refresh rate during the search period in response to a command of the multi-frequency driver.

According to some example embodiments, the multi-frequency driver may include an image analyzer that compares image data of a previous frame of an image block included in the pixel unit with image data of a current frame of the image block included in the pixel unit to determine whether the image block is a static image; a block controller that determines a size, a number and a position of the image block in which it is to be determined whether the image block is a static image; and a frequency controller that applies the second refresh rate to the image block determined as the static image.

According to some example embodiments, when a first image block is determined to the static image, the image analyzer may determine whether the first image block and a second image block adjacent to the first image block is a static image.

According to some example embodiments, the frequency controller may extend a portion of the pixel unit to which the second refresh rate is applied in the second direction opposite to the first direction, in response to a number of image blocks determined as the static image.

According to some example embodiments, when the image block is not determined to the static image, the block controller may reduce a size of the image block by changing a position of the top pixel row of the image block with respect to the first direction.

According to some example embodiments, when the image block is not determined to the static image, the image analyzer may determine whether the reduced image block is the static image.

According to some example embodiments, when a size of the image block is reduced to less than or equal to a predetermined number of pixel rows, the block controller may determine one of pixel rows included in the reduced image block as a boundary pixel row which is a top pixel row of the second area, and may determine the second area including the boundary pixel row.

According to some example embodiments, when image data of the second area is changed, the frequency controller may output an initialization signal to initialize the second area and the boundary pixel row.

According to some example embodiments, the scan driver may supply the scan signal to the scan lines at the first refresh rate in response to the initialization signal.

According to some example embodiments, the image analyzer may determine the static image based on a difference between a checksum of the image data of the previous frame of the image block and a checksum of the image data of the current frame of the image block.

According to some example embodiments, the first area may include a video, and an image displayed in the second area may be a static image.

According to some example embodiments, the display device may further include a timing controller supplying first image data corresponding to the first area to the data driver at the first refresh rate, and supplying second image data corresponding to the second area to the data driver at the second refresh rate; and a processor changing some of the second image data to supply the multi-frequency driver when an image change event of the second area occurs.

According to some example embodiments, the data driver may supply the data signal corresponding to the first area to the pixel unit at the first refresh rate, and may supply the data signal corresponding to the second area to the pixel unit at the second refresh rate.

A driving method of a display device according to some example embodiments of the present invention includes comparing image data of a previous image frame of a first image block with image data of a current image frame of the first image block to determine whether the first image block is a static image; driving the first image block at a first refresh rate, and reducing a size of the first image block in a first direction when the first image block is not a static image; determining one of pixel rows included in the reduced first image block as a boundary pixel row between a static image area and a video area, and determining the static image area including the boundary pixel row; and driving the first image block at a second refresh rate lower than the first refresh rate when the first image block is a static image.

According to some example embodiments, the determining the static image area may further include driving the static image area at the second refresh rate and driving the video area at the first refresh rate. The static image area may include an area from the boundary pixel row to a last pixel row.

According to some example embodiments, a size of an area driven at the second refresh rate may gradually increase during a search period for determining the boundary pixel row.

A display device and a driving method thereof according to some example embodiments of the present invention may compare image data in real time without a frame memory and the like, and may detect an optimal (or desired) boundary pixel row between a first area and a second area while gradually increasing an area to which a second refresh rate is applied for a short time. Thus, power consumption for driving at a multiple frequency (or multiple refresh rate) may be minimized or reduced without increasing a cost for detecting the boundary pixel row detection.

However, the characteristics of example embodiments according to the present invention are not limited to the characteristics described above, but may be variously extended in a range that does not depart from the idea and scope of the present invention.

DETAILED DESCRIPTION

Figure 1:
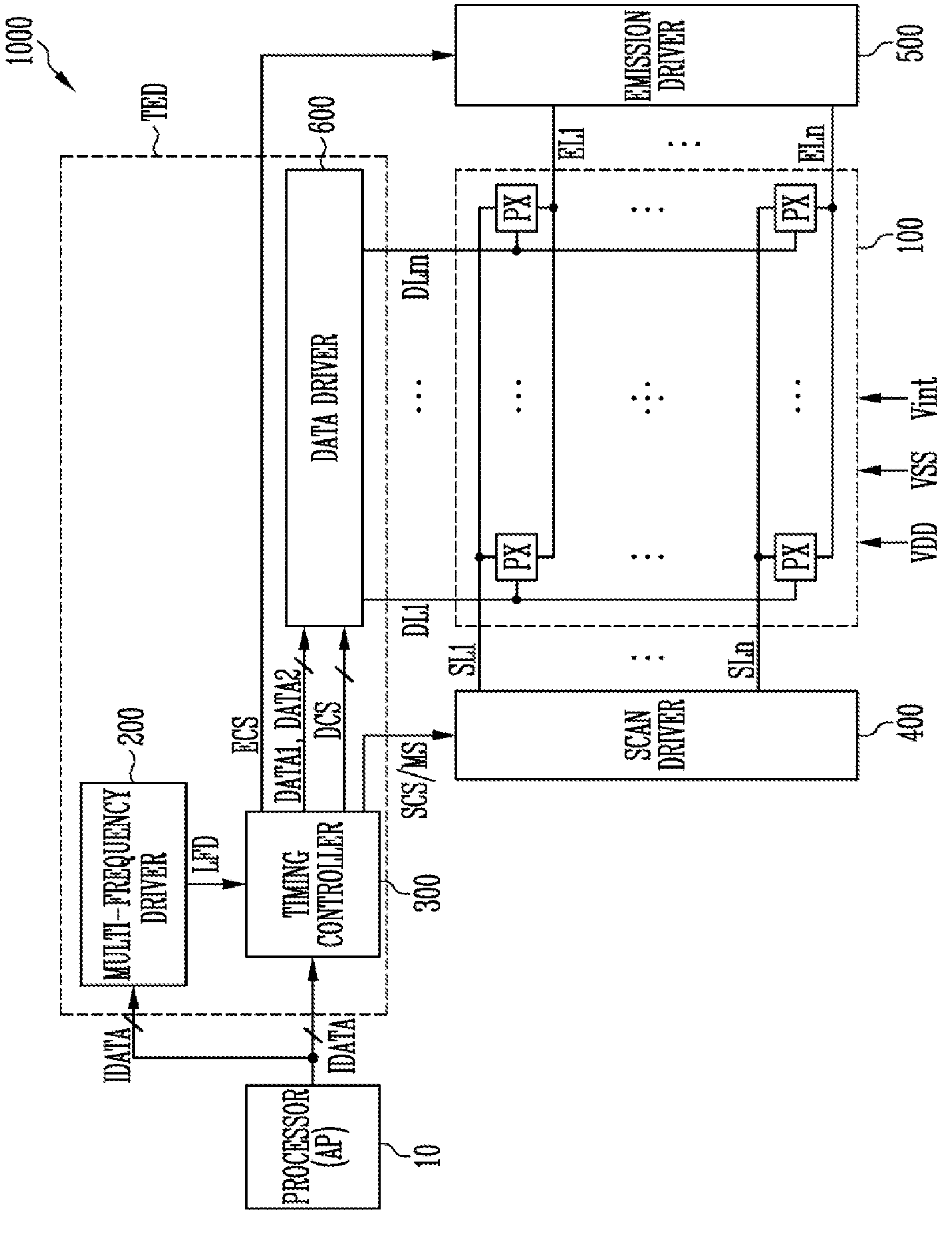
FIG. 1 is a block diagram showing a display device according to some example embodiments of the present invention.

Hereinafter, with reference to accompanying drawings, aspects of some example embodiments of the present invention will be described in more detail. The same reference numerals are used for the same constituent elements on the drawing and duplicate descriptions for the same constituent elements are omitted.

FIG. 1 is a block diagram showing a display device according to some example embodiments of the present invention.

Referring to FIG. 1, a display device 1000 may include a pixel unit 100, a multi-frequency driver 200, a timing controller 300, a scan driver 400, an emission driver 500, and a data driver 600. According to some example embodiments, the display device 1000 may further include a processor 10.

The display device 1000 may display an image by a command and data supplied from the processor 10. The processor 10 may be implemented as an application processor, a graphics processor, and the like.

The display device 1000 may be a flat display device, a flexible display device, a curved display device, a foldable display device, or a bendable display device. In addition, the display device may be applied to a transparent display device, a head-mounted display device, a wearable display device, and the like. In addition, the display device 1000 may be applied to various electronic devices such as a smartphone, a tablet, a smart pad, a TV, a monitor, and the like.

Meanwhile, the display device 1000 may be implemented as an organic light emitting diode display, a liquid crystal display, and the like. However, this is merely an example, and a configuration of the display device 1000 is not limited thereto. For example, the display device 1000 may include any suitable display device The pixel unit 100 may include a plurality of scan lines SL1 to SLn, a plurality of emission control lines EL1 to ELn, and a plurality of data lines DL1 to DLm, and may include a plurality of pixels PX connected to the scan lines SL1 to SLn, the emission control lines EL1 to ELn, and the data lines DL1 to DLm (here m and n are integer greater than 1).

Each of the pixels PX may include a driving transistor and a plurality of switching transistors.

The pixel unit 100 displays an image by using an emission of the pixels PX. For displaying a video, a relatively high driving frequency (or refresh rate) is required to represent smoother and continuous movement. The refresh rate may be referred to as a screen refresh rate, and represent a frequency at which a display screen is played for one second. That is, the refresh rate is a driving frequency of a signal output of the data driver 600 and/or the scan driver 400. For example, the refresh rate for driving the video may be a frequency of about 60 Hz or more (e.g., 120 Hz).

A high refresh rate may not be desired or necessary for displaying the static image. Therefore, the related art systems may display an image by setting the refresh rate of the entire pixel unit 100 to a low frequency of 40 Hz or less in order to reduce the power consumption for displaying the static image.

Meanwhile, the pixel unit 100 may display a screen in which the static image and the video are mixed. Related-art frequency control systems may change the refresh rate for the entire screen depending on an image mode (or power mode). Therefore, the refresh rate may be separated according to the area of the pixel unit 100 in an operating condition for driving the pixel unit 100. The refresh rate may be divided with respect to pixel rows (e.g., set or predetermined pixel rows). For example, an upper area of the pixel row selected by a low frequency driving signal LFD may be driven at a first frame rate, and a lower area of the selected pixel row may be driven at a second frame rate.

The display device 1000 according to some example embodiments of the present invention may apply different refresh rates to a portion corresponding to the static image and a portion where the video is displayed when displays a screen in which the static image and the video are mixed. Therefore, high quality videos can be implemented and power consumption can be reduced concurrently (e.g., simultaneously).

The multi-frequency driver 200 may determine (e.g., automatically determine) a first area including the video and a second area in which the static image is displayed, and may control the display device 1000 to apply different refresh rates to the first area and the second area. The multi-frequency driver 200 may compare image data IDATA between adjacent frames to determine the first area and the second area. The image data IDATA may be provided from the processor 10.

In addition, the multi-frequency driver 200 may provide a command (e.g., low frequency driving signal LFD) for driving the first area at the first refresh rate and the second area at the second refresh rate to the timing controller 300

The low frequency driving signal LFD may include information indicating the first pixel row to which the second refresh rate is applied among the pixel rows included in the pixel unit 100.

According to some example embodiments, the multi-frequency driver 200 may determine a boundary pixel row which is a top pixel row of the second area based on a result of comparing image data IDATA during a plurality of frames. For example, the multi-frequency driver 200 may gradually increase a size of an area driven at the second refresh rate during a search period for determining the boundary pixel row. Accordingly, the pixel row indicated by the low frequency driving signal LFD during the search period may vary.

The multi-frequency driver 200 can perform frequency division driving at an optimal or desired ratio for the pixel unit 100 by precisely detecting the first area to which the first refresh rate is applied and the second area to which the second refresh rate is applied.

The timing controller 300 may generate a first control signal SCS, a second control signal ECS, and a third control signal DCS in response to synchronization signals supplied from the processor 10 or the like. The first control signal SCS may be supplied to the scan driver 400, the second control signal ECS may be supplied to the emission driver 500, and the third control signal DCS may be supplied to the data driver 600.

In addition, the timing controller 300 may rearrange image data IDATA supplied from an external component (e.g., the processor 10) and may supply the rearranged image data IDATA to the data driver 600. According to some example embodiments, the timing controller 300 may divide the image data IDATA into first area data DATA1 corresponding to the first area of the pixel unit 100 and second area data DATA2 corresponding to the second area of the pixel unit 100, and may supply the first area data DATA1 and the second area data DATA2 to the data driver 600 at different frequencies. For example, the timing controller 300 may supply the first area data DATA1 to the data driver 600 at a frequency corresponding to the first refresh rate, and may supply the second area data DATA2 to the data driver 600 at a frequency corresponding to the second refresh rate. Accordingly, a power consumption of the display device 1000 may be improved.

The first control signal SCS may include a scan start pulse and clock signals. The scan start pulse may control a first timing of the scan signal. The clock signals may be used to shift the scan start pulse.

The second control signal ECS may include an emission control start pulse and clock signals. The emission control start pulse may control a first timing of the emission control signal. The clock signals may be used to shift the emission control start pulse.

The third control signal DCS may include a source start pulse and clock signals. The source start pulse controls a sampling starting time point of data. The clock signals are used to control a sampling operation.

According to some example embodiments, the timing controller 300 may supply a masking signal MS to the scan driver 400 for a multi-frequency driving. The masking signal MS may be generated in response to the low frequency driving signal LFD. For example, the masking signal MS is a signal for controlling a scan line of a pixel row (e.g., a first pixel row of an area to which the second refresh rate is applied) indicated by the low frequency driving signal LFD. For example, the masking signal MS may be supplied to the scan driver 400 at the second refresh rate. Accordingly, the scan driver 400 may output a scan signal at a second refresh rate from a scan line of the pixel row indicated by the masking signal MS to the last scan line.

The scan driver 400 may receive the first control signal SCS and the masking signal MS from the timing controller 300, and may supply the scan signal to the scan lines SL1 to SLn based on the first control signal SCS and the masking signal MS. For example, the scan driver 400 may sequentially supply the scan signal to the scan lines SL1 to SLn. When the scan signal is supplied sequentially, the pixels PX may be selected in unit of horizontal line (or in unit of pixel row).

According to some example embodiments, the scan driver 400 may supply the scan signal to the first area at a frequency of the first refresh rate, and may supply the scan signal to the second area at a frequency of the second refresh rate in response to the masking signal MS. For example, the scan driver 400 may supply the scan signal from the boundary pixel row to the last pixel row at the second refresh rate.

According to some example embodiments, during the search period for determining the boundary pixel row, the scan driver 400 may gradually increase the number of the scan lines driven at the second refresh rate in response to the low frequency driving signal LFD.

The scan signal may be set to a gate-on voltage (e.g., low voltage). A transistor included in the pixel PX and receiving the scan signal may be set to a turn-on state when the scan signal is supplied.

The emission driver 500 may receive a second control signal ECS from the timing controller 300, and may supply the scan signal to the emission control lines EL1 to ELn based on the second control signal ECS. For example, the emission driver 500 may sequentially supply the emission control signals through the emission control lines EL1 to ELn.

The emission control signal may be set to a gate-on voltage (e.g., low voltage). A transistor included in the pixel PX and receiving the emission control signal may be turned on when the emission control signal is supplied, and may be turned off in other cases.

The emission control signal is used to control a light emitting time of the pixels PX. For this purpose, the emission control signal may be set to have a width greater than the scan signal.

According to some example embodiments, the emission driver 500 may supply the emission control signal to the first area at the first refresh rate, and may supply the emission control signal to the second area at the second refresh rate. However, this is an example, and the emission driver 500 may supply the emission control signal to the entire pixel unit 100 at the same frequency.

The scan driver 400 and the emission driver 500 may be mounted on a substrate through a thin film process, respectively. In addition, the scan driver 400 may be located at both sides with the pixel unit 100 interposed therebetween. The emission driver 500 may also be located on both sides with the pixel unit 100 interposed therebetween.

In addition, the scan driver 400 and the emission driver 500 are shown to provide the scan signal and the emission control signal, respectively in FIG. 1, but embodiments according to the present invention are not limited thereto. For example, the scan signal and the emission control signal may be supplied by one driver.

The data driver 600 may receive the third control signal DCS and the image data signal (e.g., first area data DATA1 and second area data DATA2) from the timing controller 300. The data driver 600 may supply the data signal to the data lines DL1 to DLm in response to the third control signal DCS. The data signal supplied to the data lines DL1 to DLm may be supplied to the pixels PX selected by the scan signal. For example, the data driver 600 may supply the data signal to the data lines DL1 to DLm to be synchronized with the scan signal.

According to some example embodiments, the data driver 600 may supply the data signal to the first area at a frequency of the first refresh rate, and may supply the data signal to the second area at a frequency of the second refresh rate. Accordingly, a power consumption of the display device 1000 may be improved.

Meanwhile, the multi-frequency driver 200, the timing controller 300, and the data driver 600 are shown as separate configurations or components in FIG. 1, but embodiments according to the present invention are not limited thereto. For example, at least two of the multi-frequency driver 200, the timing controller 300, and/or the data driver 600 may be included in one driving chip TED or an integrated circuit. Alternatively, the multi-frequency driver 200 may be included in the timing controller 300.

In addition, n scan lines SL1 to SLn and n emission control lines EL1 to ELn are shown in FIG. 1, but embodiments according to the present invention are not limited thereto. For example, pixels PX located on a current horizontal line (or current pixel row) corresponding to a circuit structure of the pixels PX may be further connected to a scan line located on a previous horizontal line (or a previous pixel row) and/or a scan line located on a next horizontal line (or a next pixel row). For this purpose, dummy scan lines and/or dummy emission control lines not shown may be additionally formed in the pixel unit 100.

According to some example embodiments, the display device 1000 may supply a first power supply VDD (e.g., supplying a high voltage), a second power supply VSS (e.g., supplying a low voltage or ground), and an initialization power supply Vint (e.g., supplying an initialization voltage) for driving the pixel PX to the pixel unit 100.

Figure 2A:
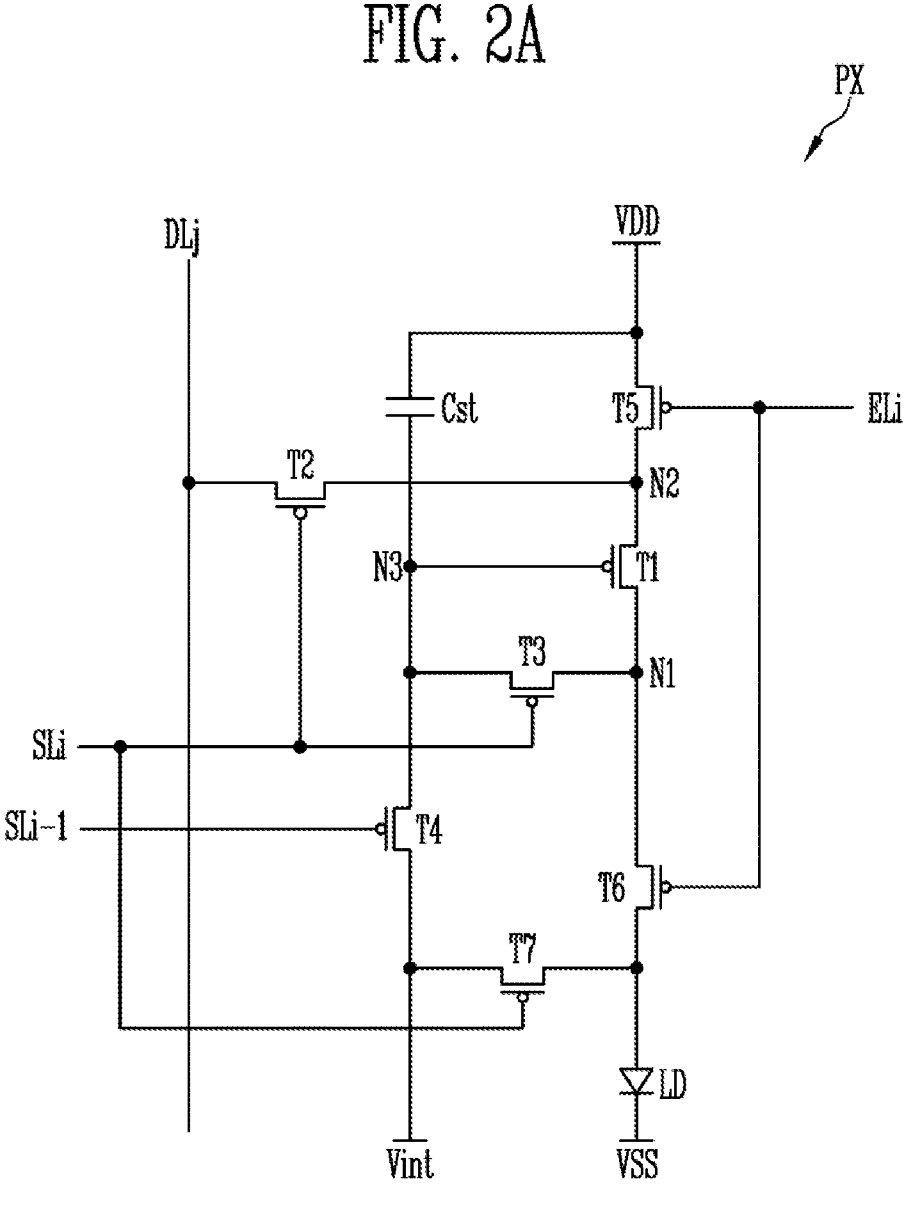
FIG. 2A is a circuit diagram showing an example of a pixel included in a display device shown in FIG. 1.
Figure 2B:
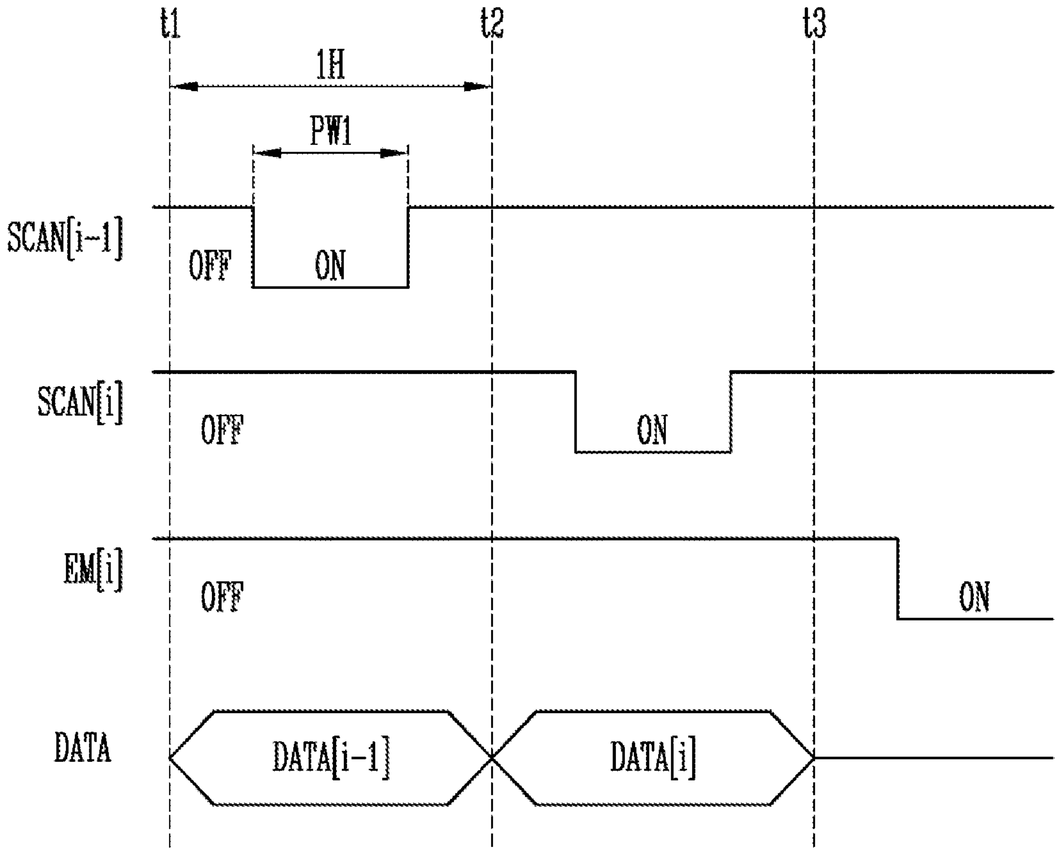
FIG. 2B is a timing diagram showing an example of an operation of a pixel shown in FIG. 2A.

FIG. 2A is a circuit diagram showing an example of a pixel circuit of one or more of the pixels PX included in a display device shown in FIG. 1, and FIG. 2B is a timing diagram showing an example of an operation of the pixel circuit shown in FIG. 2A.

Referring to FIGS. 2A and 2B, one or more of the pixels PX may each include first to seventh transistors T1 to T7, a storage capacitor Cst, and a light emitting element LD.

Each of the first to seventh transistors T1 to T7 may be implemented as a P-type transistor, but is not limited thereto. For example, at least some of the first to seventh transistors T1 to T7 may be implemented as an N-type transistor. In addition, each active layer (or semiconductor layer) of the first to seventh transistors T1 to T7 may include a polysilicon-based semiconductor (e.g., low temperature poly-silicon semiconductor, etc.) or oxide semiconductor.

A first electrode of the first transistor T1 (or driving transistor) may be connected to a second node N2 or may be connected to a first power line via the fifth transistor T5. The second electrode of the first transistor T1 may be connected to a first node N1 or may be connected to an anode of the light emitting element LD via the sixth transistor T6. A gate electrode of the first transistor T1 may be connected to a third node N3. The first transistor T1 may control an amount of current flowing from the first power line (e.g., a power line transferring a voltage of the first power supply VDD) via the light emitting element LD to the second power line (e.g., a power line transferring a voltage of the second power supply VSS) in response to a voltage of the third node N3.

The second transistor T2 may be connected between the data line DLj and the second node N2. A gate electrode of the second transistor T2 may be connected to the scan line SLi. The second transistor T2 may be turned on when the scan signal is supplied to the scan line SLi to electrically connect the data line DLj and the first electrode of the first transistor T1.

The third transistor T3 may be connected between the first node N1 and the third node N3. A gate electrode of the third transistor T3 may be connected to the scan line SLi. The third transistor T3 may be turned on when the scan signal is supplied to the scan line SLi to electrically connect the first node N1 and the third node N3. Therefore, when the third transistor T3 is turned on, the first transistor T1 may be connected in a form of a diode.

The storage capacitor Cst may be connected between the first power supply VDD and the third node N3. The storage capacitor Cst may store a voltage corresponding to the data signal and the threshold voltage of the first transistor T1.

The fourth transistor T4 may be connected between the third node N3 and the initialization power supply Vint. A gate electrode of the fourth transistor T4 may be connected to the previous scan line SLi−1. The fourth transistor T4 may be turned on when the scan signal is supplied to the previous scan line SLi−1 to supply a voltage of the initialization power supply Vint to the first node N1. The voltage of the initialization power supply Vint may be set to have a lower voltage level than the data signal.

The fifth transistor T5 may be connected between the first power line and the second node N2. A gate electrode of the fifth transistor T5 may be connected to the emission control line ELi. The fifth transistor T5 may be turned off when the emission control signal is supplied to the emission control line ELi, and may be turned on in other cases.

The sixth transistor T6 may be connected between the first node N1 and the light emitting element LD. A gate electrode of the sixth transistor T6 may be connected to an emission control line ELi. The sixth transistor T6 may be turned off when the emission control signal is supplied to the emission control line ELi, and may be turned on in other cases.

The seventh transistor T7 may be connected between the initialization power supply Vint and the anode of the light emitting element LD. A gate electrode of the seventh transistor T7 may be connected to the scan line SLi. The seventh transistor T7 may be turned on when the scan signal is supplied to the scan line SLi to supply the initialization power supply Vint to the anode of the light emitting element LD.

The anode of the light emitting element LD may be connected to the first transistor T1 via the sixth transistor T6, and the cathode of the light emitting element LD may be connected to the second power supply VSS (e.g., supplying a low voltage or ground). The light emitting element LD may generate light having a luminance (e.g., a set or predetermined luminance) in response to the current supplied from the first transistor T1.

FIG. 2B shows the previous scan signal SCAN[i−1] supplied to the previous scan line SLi−1, the scan signal SCAN[i] supplied to the scan line SLi, the emission control signal EM[i] supplied to the emission control line ELi, and a data signal DATA during one frame section.

The previous scan signal SCAN[i−1] may be supplied between the first time point t1 and the second time point t2. A first pulse width PW1 of a section in which the previous scan signal SCAN[i−1] has a turn-on voltage level may be less than one horizontal time 1H.

The fourth transistor T4 may be turned on, and the third node N3 or the storage capacitor Cst may be initialized by the voltage of the initialization power supply Vint in response to the previous scan signal SCAN[i−1]. For example, a section between the first time point t1 and the second time point t2 may be an initialization section.

The scan signal SCAN[i] may be supplied between the second time point t2 and the third time point t3.

The second transistor T2 and the third transistor T3 may be turned on, and a data signal (i.e., the data signal DATA[i] corresponding to the scan signal SCAN[i]) may be stored in the storage capacitor Cst in response to the scan signal SCAN[i] of a turn-on voltage level. The section between the second time point t2 and the third time point t3 may be a writing section.

In addition, the seventh transistor T7 may be turned on in response to the scan signal SCAN[i], and the anode of the light emitting element LD may be initialized by the voltage of the initialization power supply Vint between the second time point t2 and the third time point t3.

After the third time point t3, the emission control signal EM[i] may transition from a turn-off voltage level to a turn-on voltage level.

In response to the emission control signal EM[i] of the turn-on voltage level, the fifth transistor T5 and the sixth transistor T6 may be turned on, a current corresponding the voltage level (i.e., data signal DATA[i] corresponding to the scan signal SCAN[i]) of the third node N3 may be supplied to the light emitting element LD, and the light emitting element LD may emit light with luminance corresponding to the current. A section after the third time point t3 of one frame section may be a light emitting section.

According to some example embodiments, at least one of the scan signal SCAN[i], the data signal DATA[i], or the emission control signal EM[i] supplied to the pixel PX may vary according to the selected refresh rate.

Figure 3:
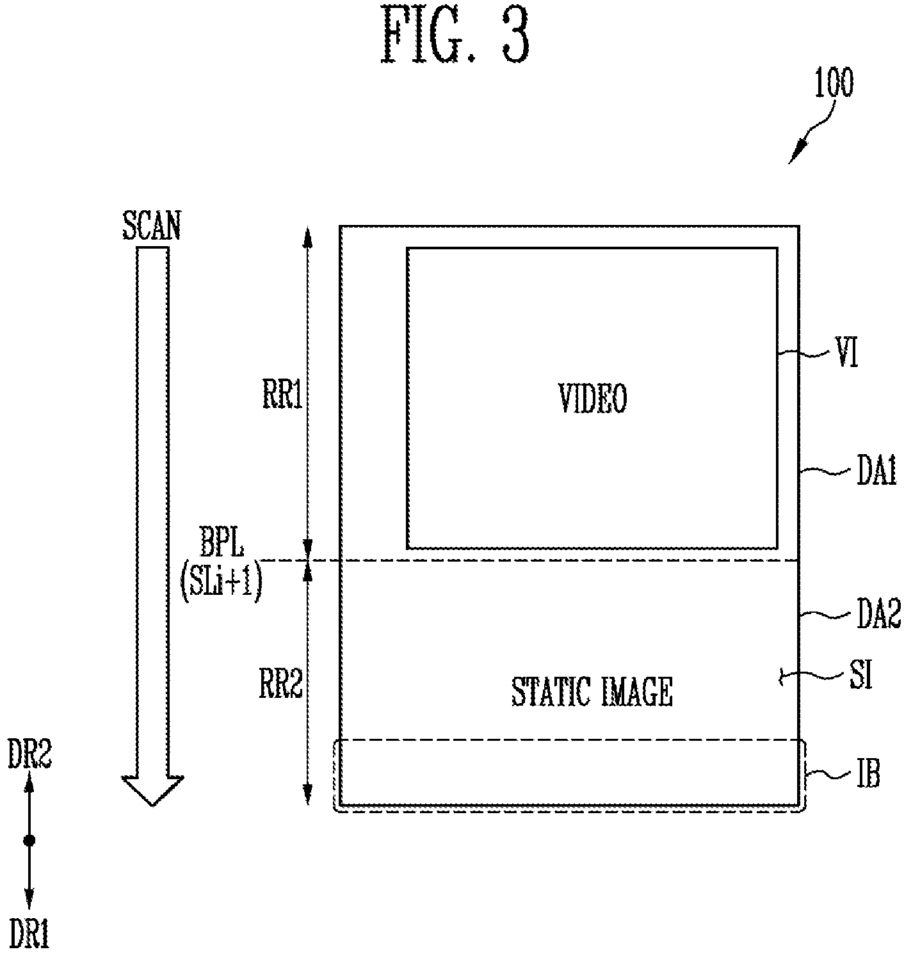
FIG. 3 is a drawing showing an example of an image displayed on a display device shown in FIG. 1.

FIG. 3 is a drawing showing an example of an image displayed on a display device shown in FIG. 1.

Referring to FIGS. 1 and 3, the pixel unit 100 may display a static image SI and a video VI simultaneously.

A scan direction to which the scan signal is sequentially supplied may be a first direction DR1.

The multi-frequency driver 200 may distinguish the first area DA1 and the second area DA2 with respect to the boundary pixel row BPL. The first area DA1 may include an area where the video VI is displayed, and the second area DA2 may include the static image SI other than the first area DA1.

The multi-frequency driver 200 may analyze the image data IDATA during the search period (e.g., a set or predetermined search period) to determine the boundary pixel row BPL of an optimal or desired position. According to some example embodiments, the multi-frequency driver 200 compares the image data of the previous frame corresponding to an image block IB with the image data of the current frame corresponding to an image block IB to determine whether or not the image block IB is a static image. A specific method of determining the second area DA2 and the boundary pixel row BPL using the image block IB will be described in detail with reference to FIG. 5 or below.

The first area DA1 may be defined as an area on the boundary pixel row BPL, and the first area DA1 may be driven at the first refresh rate RR1. For example, the first refresh rate RR1 may be set to 240 Hz, 120 Hz, 60 Hz, or the like. The remaining area except the first area DA1 of the pixel unit 100 may be the second area, and the second area DA2 may be driven at the second refresh rate RR2. The second refresh rate RR2 may be a frequency lower than the first refresh rate RR1 and may be set to 30 Hz, 10 Hz, 1 Hz, or the like.

The boundary pixel row BPL may be the top pixel row of the second area. In addition, a scan signal may be supplied at a frequency of the second refresh rate RR2 from an i+1-th scan line SLi+1 connected to the boundary pixel row BPL to an n-th scan line SLn. On the other hand, the scan signal may be supplied at a frequency of the first refresh rate RR1 from a first scan line SL1 to an i-th scan line SLi.

According to some example embodiments, in response to the driving frequency of the scan signal, the data driver 600 may supply data signals corresponding to the first area DA1 at the frequency of the first refresh rate RR1, and may supply data signals corresponding to the second area DA2 at the frequency of the second refresh rate RR2.

Thus, as will be described in more detail below, according to some example embodiments, the display device may be configured to identify a boundary pixel row BPL separating a first display area DA1 from a second display area DA2 based on the images being displayed, where the first display area DA1 displays images to be displayed at a first refresh rate (e.g., video images), and the second display area DA2 displays images to be displayed at a second refresh rate (e.g., static images).

Figure 4A:
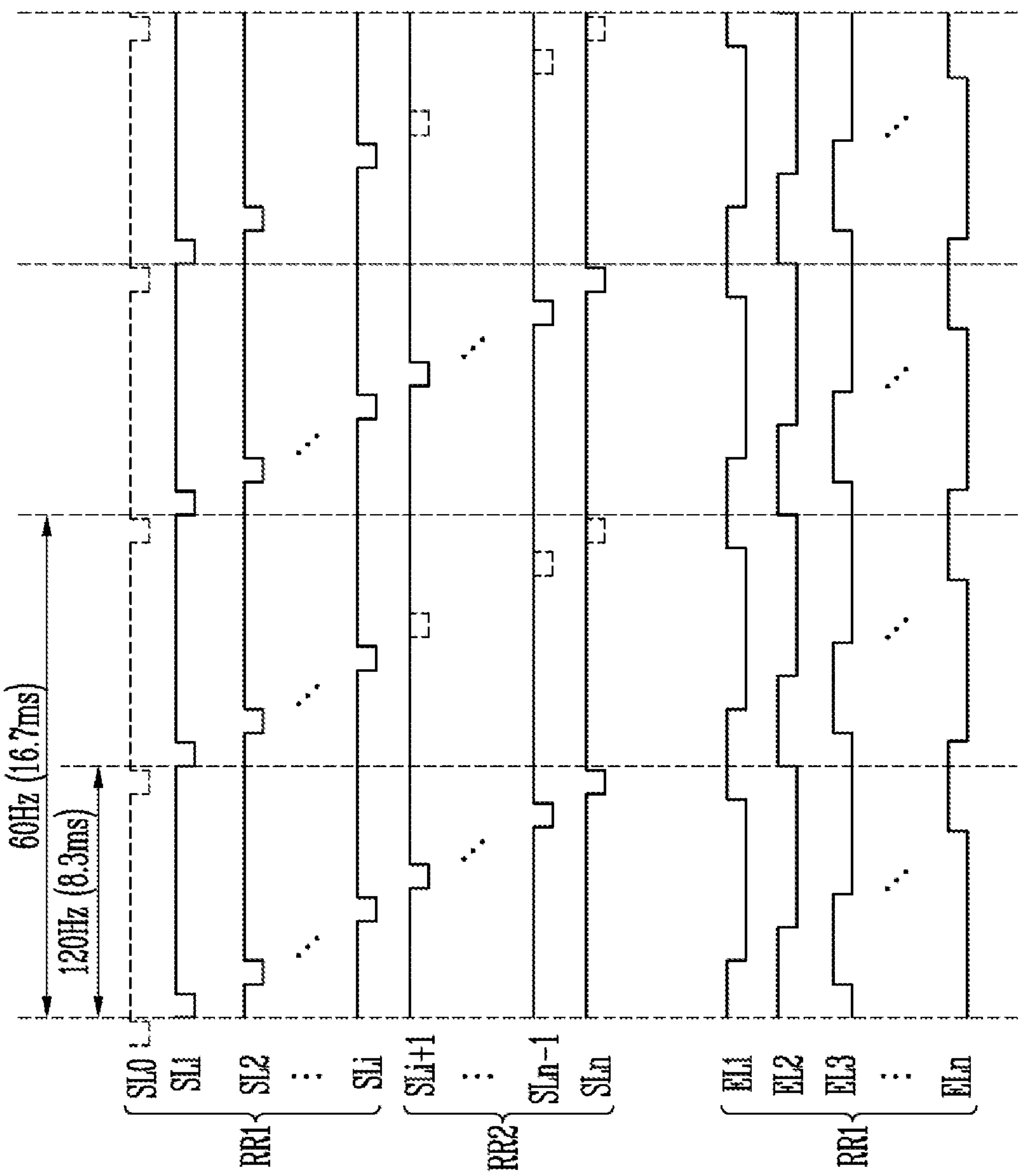
FIGS. 4A and 4B are timing diagrams showing examples of signals supplied to a pixel unit to display an image of FIG. 3.
Figure 4B:
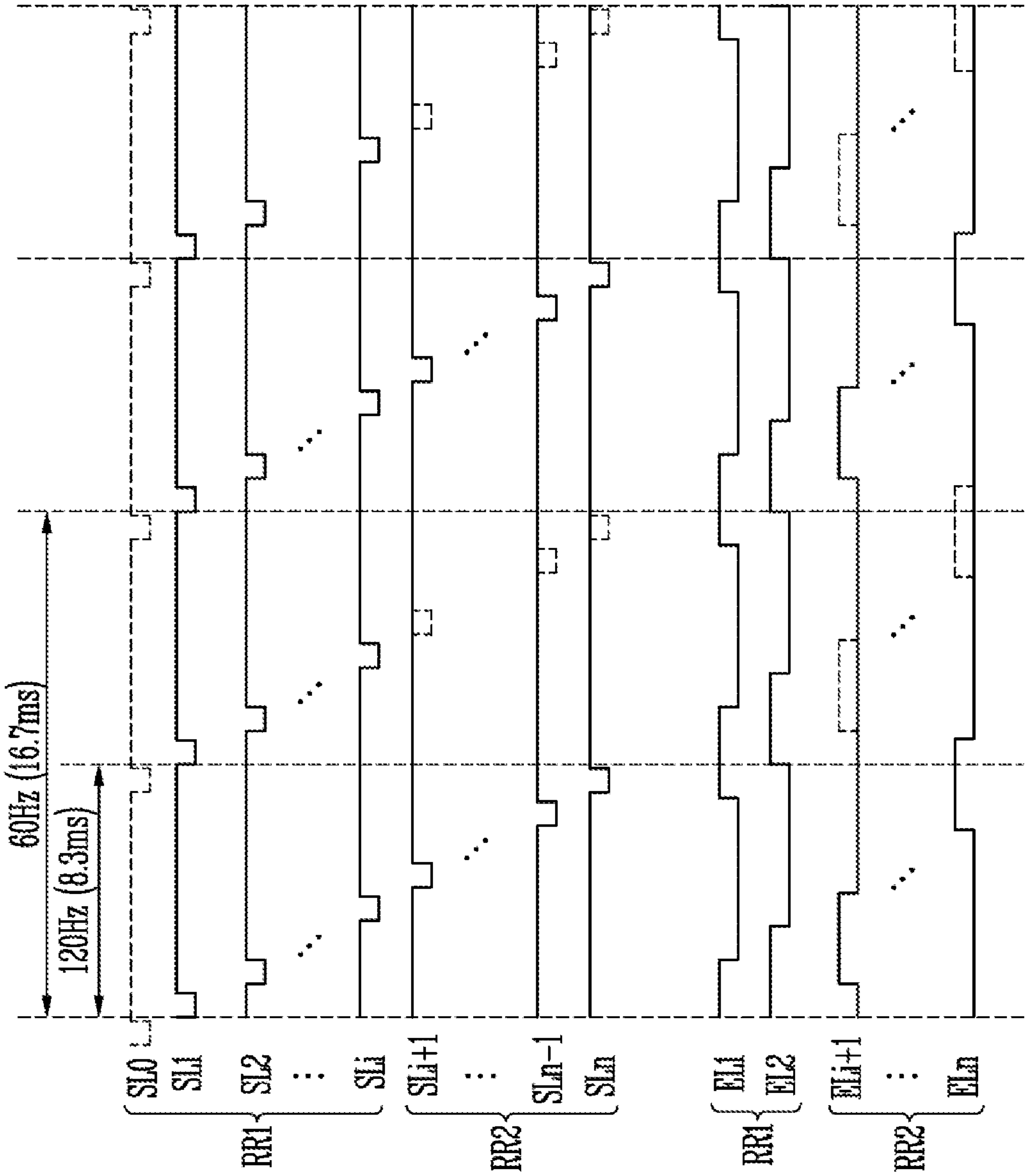

FIGS. 4A and 4B are timing diagrams showing examples of signals supplied to a pixel unit to display an image of FIG. 3.

Referring to FIGS. 1, 3, 4A and 4B, the scan driver 400 may supply scan signals sequentially to scan lines (e.g., first to i-th scan lines SL1 to SLi) of first area DA1 at the first refresh rate RR1, and may supply scan signals sequentially to scan lines (e.g., i+1-th to n-th scan lines SLi+1 1 to SLn) of the second area DA2 at the second refresh rate RR2.

The timing diagrams of FIGS. 4A and 4B show only a scan signal whose refresh rate (or frequency) changes according to a command of the multi-frequency driver 200 among a plurality of scan signals supplied to one pixel. For example, when a plurality of scan signals are supplied to the pixel, some scan signals may be supplied at one frequency regardless of a change of a refresh rate for driving the pixel.

For example, in a case of the pixel PX of FIG. 2A, different scan signals may be supplied to the second transistor T2 and the third transistor T3 according to the refresh rate. For example, the scan signal supplied to the third transistor T3 may be supplied at the frequency changing according to a change of the refresh rate (i.e., in response to the masking signal MS). On the other hand, the scan signal supplied to the second transistor T2 may be supplied at a constant frequency regardless of the change of the refresh rate. In this case, FIGS. 4A and 4B shows the scan signal supplied to the third transistor T3.

According to some example embodiments, dummy scan line SL0 is for supplying a dummy scan signal for driving pixels PX in a first pixel row.

As shown in FIG. 4A, the scan signal may be supplied to lines SL1 to SLi corresponding to the first area DA1 at a frequency of 120 Hz, and the scan signal may be supplied to lines SLi+1 to SLn corresponding to the second area DA2 at a frequency of 60 Hz. Therefore, a power consumption due to a toggling of the scan signal supplied to the second area DA2 may be reduced.

On the other hand, the emission control signal may be supplied to the emission control lines EL1 to ELn at the same frequency (e.g., 120 Hz) as the first refresh rate RR1 regardless of the change of the refresh rate between display areas.

However, this is as an example, the emission control signal may be supplied to the emission control lines ELi+1 to ELn of the second area DA2 at a frequency of the second refresh rate RR2.

For example, as shown in FIG. 4B, the emission control signal supplied to the second area DA2 may have a turn-off level at a frequency of the second refresh rate RR2. Accordingly, a toggling of the emission control signal corresponding to the second area DA2 may be reduced, thereby reducing power consumption.

Figure 5:
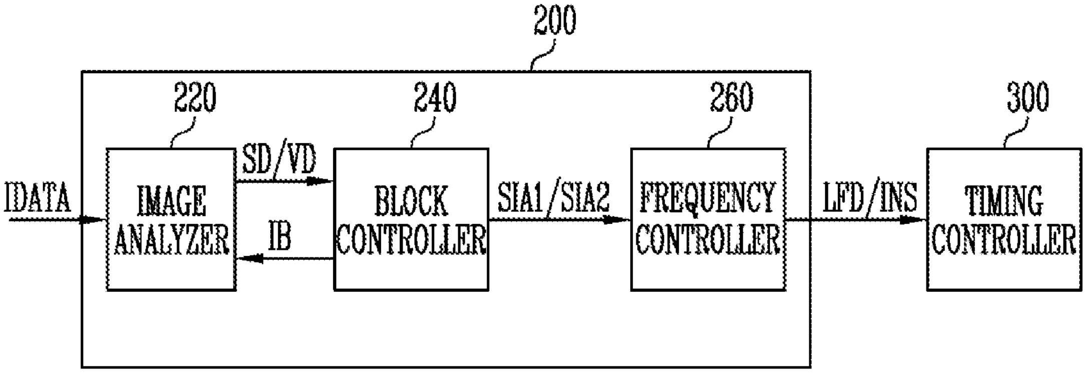
FIG. 5 is a block diagram showing an example of a multi-frequency driver included in a display device of FIG. 1.
Figure 6:
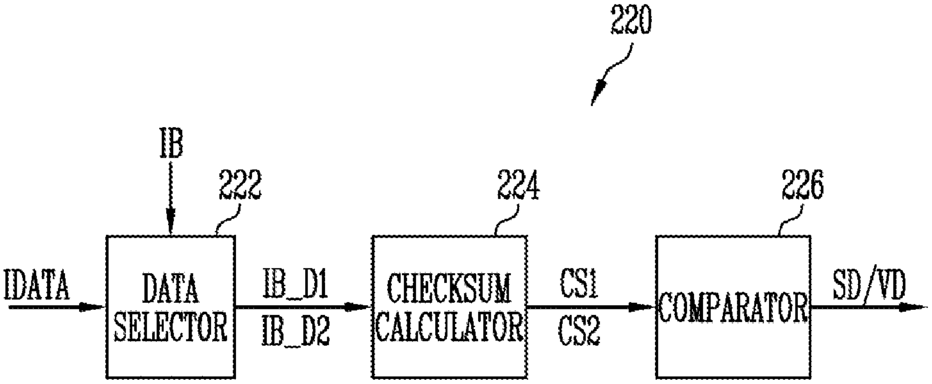
FIG. 6 is a block diagram showing an example of an image analyzer included in a multi-frequency driver of FIG. 5.

FIG. 5 is a block diagram showing an example of a multi-frequency driver included in a display device of FIG. 1, and FIG. 6 is a block diagram showing an example of an image analyzer included in a multi-frequency driver of FIG. 5.

Referring to FIGS. 1, 3, 5 and 6, the multi-frequency driver 200 may include an image analyzer 220, a block controller 240 and a frequency controller 260.

The image analyzer 220 may receive image data IDATA from the processor 10, and may receive information on an image block IB of which the image data is compared from the block controller 240. The image analyzer 220 may compare image data IB_D1 of the previous frame of the image block IB included in the pixel unit 100 with image data IB_D2 of the current frame the image block IB to determine whether or not the image block IB is a static image. According to some example embodiments, the image block IB may include a plurality of pixel rows. A size of the image block IB may be adjusted according to a use environment, a user setting, and the like.

According to some example embodiments, the image analyzer 220 may determine the static image based on a difference between a checksum (e.g., first checksum CS1) of the image data IB_D1 of the previous frame of the image block IB and a checksum (e.g., second checksum CS2) of the image data IB_D2 of the current frame of the image block IB. For example, when the difference between the first checksum CS1 and the second checksum CS2 is greater than the reference value (e.g., a set or predetermined reference value) (e.g., 0), the image analyzer 220 may determine that the corresponding image block IB includes a video (or is not a static image), and may provide a first result VD to the block controller 240.

When the first checksum CS1 and the second checksum CS2 are equal (or less than or equal to the reference value), the image analyzer 220 determines that the corresponding image block IB is a static image, and may provide the second result SD to the block controller 240.

However, this is an example, but a method of judging the static image is not limited thereto. Whether or not the image block IB is a static image may be determined through various known algorithms and/or hardware configurations.

Meanwhile, the static image only needs to check whether or not the image data of the corresponding area matches, so that only a least significant bit (LSB) of the data checksum may be compared. For example, only the last 4 bits of the sum of the image data of the corresponding image block IB may be compared. Accordingly, a burden for comparing data is reduced, and a memory configuration such as a frame memory is not used.

According to some example embodiments, the image analyzer 220 may include a data selector 222, a checksum calculator 224, and a comparator 226.

The image analyzer 220 may receive information on image data IDATA and an image block IB. The image analyzer 220 may provide image data information of the image block IB selected from the image data IDATA of the entire pixel unit 100 to the checksum calculator 224.

The checksum calculator 224 may calculate the checksums CS1 and CS2 of the image data IB_D1 and IB_D2 corresponding to the image block IB.

The comparator 226 may output a first result VD or a second result SD based on the difference between the first checksum CS1 and the second checksum CS2.

The block controller 240 may determine a size, a number and a position of the image block IB in which it is to be determined whether or not the image block is a static image based on the first result VD or the second result SD received from the image analyzer 220. In addition, the block controller 240 may supply first static image area data SIA1 or second static image area data SIA2 including information on an area determined as the static image in the current frame to the frequency controller 260 based on the first result VD or the second result SD.

According to some example embodiments, when the first image block (e.g., a set or predetermined first image block) is determined to be a static image, the block controller 240 may provide information on a new second image block to the image analyzer 220. According to some example embodiments, the second image block may be an image block adjacent to the first image block in the second direction DR2. The image analyzer 220 may determine whether or not the second image block is a static image. The block controller 240 and the image analyzer 220 may repeat the operation until a video is detected.

When it is determined that all of the image blocks corresponding to the entire pixel unit 100 are static images, the block controller 240 may provide the first static image area data SIA1 to the frequency controller 260. In this case, the first static image area data SIA1 may indicate the entire pixel unit 100.

According to some example embodiments, when it is determined that the image block is not a static image, the block controller 240 may reduce a size of the image block by changing a position of the top pixel row of the image block in the first direction DR1. The block controller 240 may provide information on the reduced image block to the image analyzer 220. The image analyzer 220 may determine whether or not the reduced image block is a static image. In this case, when the reduced image block is determined as a static image, the block controller 240 may provide the first static image area data SIA1 to the frequency controller 260. The first static image area data SIA1 may indicate an area from the top pixel row to the last pixel row of the reduced image blocks.

Meanwhile, the block controller 240 and the image analyzer 220 may repeat the operation of comparing the image data by reducing the corresponding image block until the static image is detected. However, when the size of the image block is reduced to less than or equal to the number of pixel rows (e.g., a set or predetermined number of pixel rows), the block controller 240 may stop reducing the image block and provide the second static image area data SIA2 to the frequency controller 260. In this case, the second static image area data SIA2 may be data that finally determines the second area DA2. That is, the top pixel row included in the second static image area data SIA2 is determined as a boundary pixel row BPL.

The frequency controller 260 may apply the second refresh rate RR2 to the image block determined as the static image based on the first static image area data SIA1 or the second static image area data SIA2. The frequency controller 260 may generate a low frequency driving signal LFD indicating a first pixel row to which the second refresh rate RR2 is applied based on static image area data SIA. The frequency controller 260 may supply the low frequency driving signal LFD to the timing controller 300.

The low frequency driving signal LFD includes information on the top pixel row included in the static image area data SIA. Accordingly, a position of a display area driven at the second refresh rate RR2 may be changed. According to some example embodiments, the low frequency driving signal LFD may further include frequency information of the second refresh rate RR2.

According to some example embodiments, when the image data of the static image area or the second area is changed, the frequency controller 260 may output an initialization signal INS for initializing the static image area or the second area. The scan driver 400 may supply the scan signal to the entire scan lines SL1 to SLn at the first refresh rate RR1 in response to the initialization signal INS.

As described above, by repeating the operation of comparing the image data while changing the position, the size, and the number of the image block, an accurate boundary between the first area DA1 and the second area DA2 may be detected. In addition, as the area to which the second refresh rate is applied gradually increases, an optimal or desired boundary pixel row BPL may be determined.

Therefore, power consumption for driving at a multiple frequency (or multiple refresh rate) may be minimized.

FIGS. 7A to 7I are drawings showing a driving method of a display device according to some example embodiments of the present invention.

Referring to FIGS. 1, 7A to 7I, the display device 1000 simultaneously displaying the video VI and the static image SI may determine the boundary pixel row BPL, which is the top pixel row of the second area DA2, based on the result of comparing the image data IDATA during a plurality of frames.

Figure 7A:
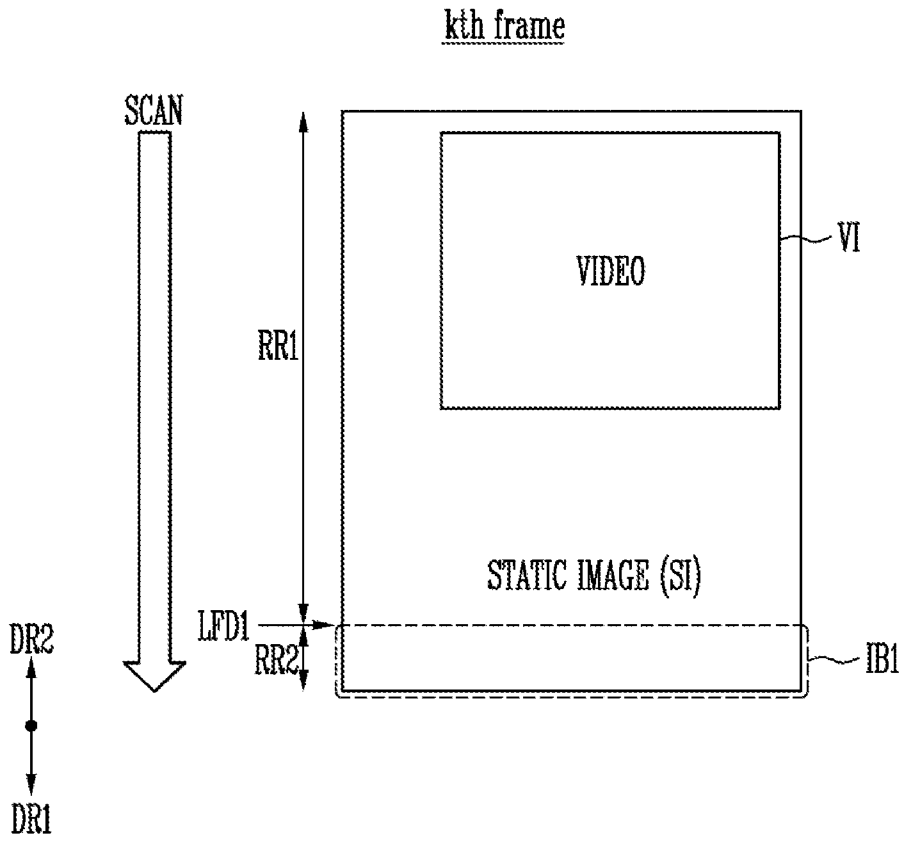
FIGS. 7A to 7I are drawings showing a driving method of a display device according to some example embodiments of the present invention.

As shown in FIG. 7A, the multi-frequency driver 200 may determine whether or not the first image block IB1 is a static image. The multi-frequency driver 200 may determine whether or not the first image block IB1 is a static image based on a difference between the image data of the previous frame (e.g., k−1-th frame (k is a natural number)) of the first image block IB1 and the image data of the current frame (e.g., k-th frame).

When the first image block IB1 is determined as a static image, the multi-frequency driver 200 may generate a first low frequency driving signal LFD1 corresponding to the top pixel row of the first image block IB1.

The timing controller 300 and the scan driver 400 may drive the first image block IB1 at the second refresh rate RR2 in the current frame based on the first low frequency driving signal LFD1. According to some example embodiments, the emission driver 500 and/or the data driver 600 may drive the first image block IB1 at the second refresh rate RR2. Accordingly, the multi-frequency driving may be performed in real time without losing a frame by analyzing the image data received from the processor 10 immediately.

The remaining area except the first image block IB1 is driven at the first refresh rate RR1.

Figure 7B:
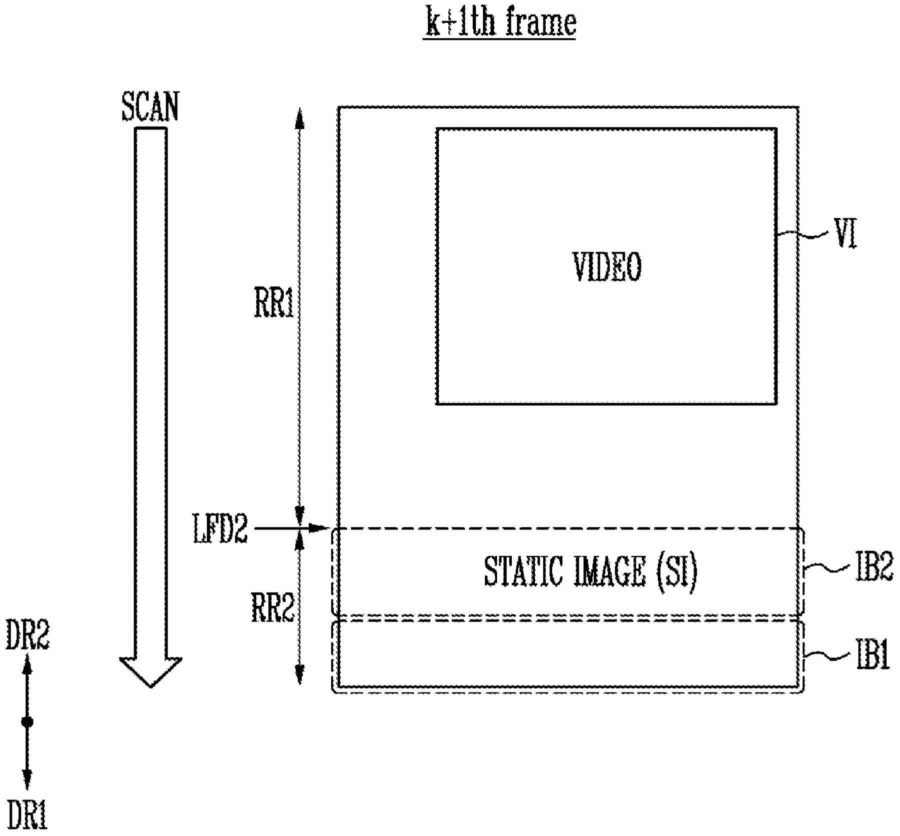

As shown in FIG. 7B, for the image data of the k+1-th frame, the multi-frequency driver 200 may determine whether or not the first image block IB1 and the second image block IB2 are static images. The second image block IB2 may be adjacent to the first image block IB1 in the second direction DR2. That is, the determination of whether or not the image block is a static image may be performed in a reverse direction of the scan direction.

When the first and second image blocks IB1 and IB2 are determined as static images, the multi-frequency driver 200 may generate a second low frequency driving signal LFD2 corresponding to the top pixel row of the second image block IB2. Accordingly, the first and second image blocks IB1 and IB2 may be driven at the second refresh rate RR2 in a k+1-th frame. Next, the operation shown in FIG. 7C may be performed.

Meanwhile, in FIG. 7B, when it is determined that the first image block IB1 is not a static image, the operation for comparing the image data may be reset. For example, the operation for comparing the image data is stopped, and after time elapses (e.g., a set or predetermined time elapses), the operation of FIG. 7A may be performed.

Figure 7C:
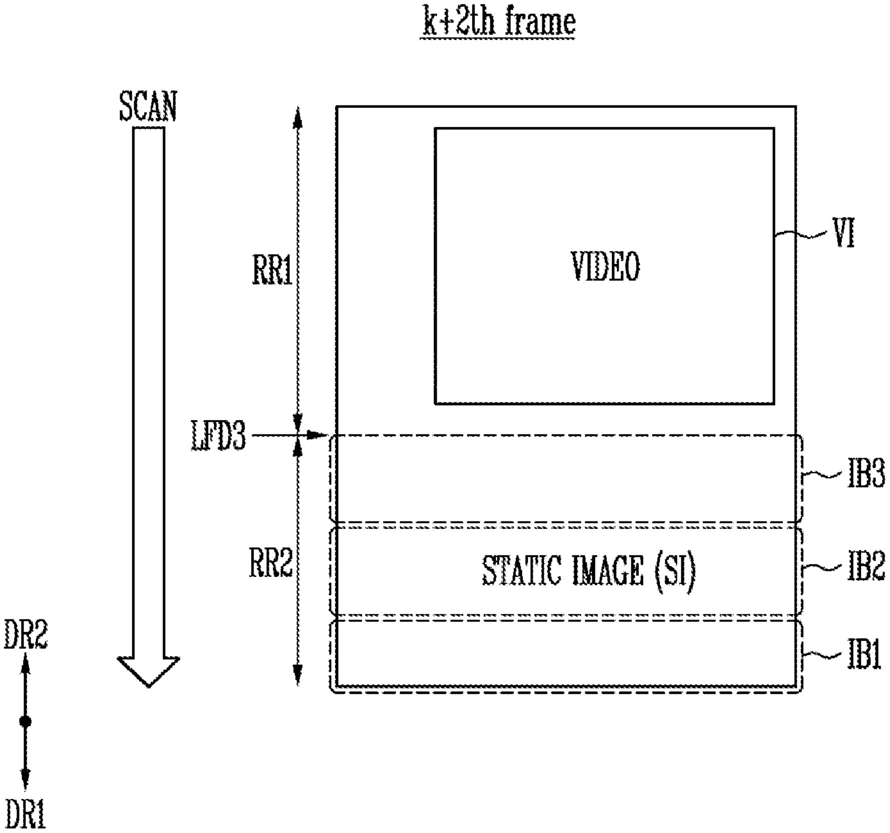

As shown in FIG. 7C, the multi-frequency driver 200 may determine whether or not the first image block IB1, the second image block IB2, and the third image block IB3 are static images for the image data of a k+2-th frame. Because the operation of FIG. 7C is substantially the same as the operation of FIG. 7B, redundant descriptions will be omitted.

The multi-frequency driver 200 may generate a third low frequency driving signal LFD3 corresponding to the top pixel row of the third image block IB3. Accordingly, first to third image blocks IB1 to IB3 may be driven at the second refresh rate RR2 in the k+2-th frame.

Figure 7D:
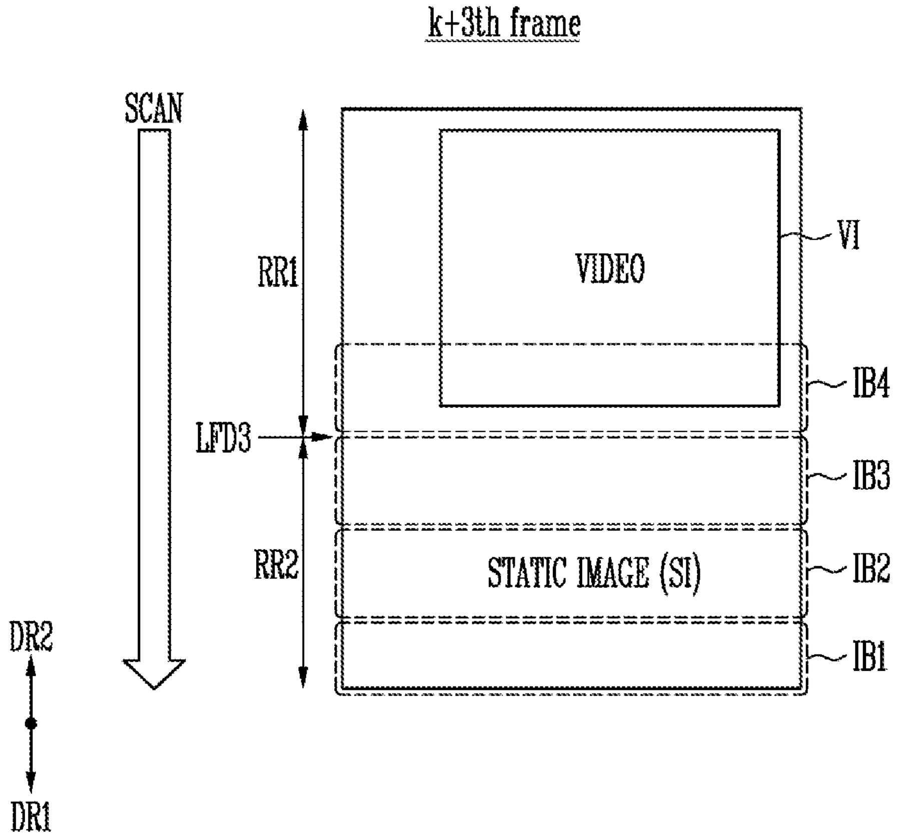

Next, as shown in FIG. 7D, the determination of whether or not first to fourth image blocks IB1 to IB4 are static images may be performed for image data of the k+3-th frame. When the fourth image block IB4 includes a video, an output of the third low frequency driving signal LFD3 may be maintained. Therefore, only first to third image blocks IB1 to IB3 may be driven at the second refresh rate RR2.

Figure 7E:
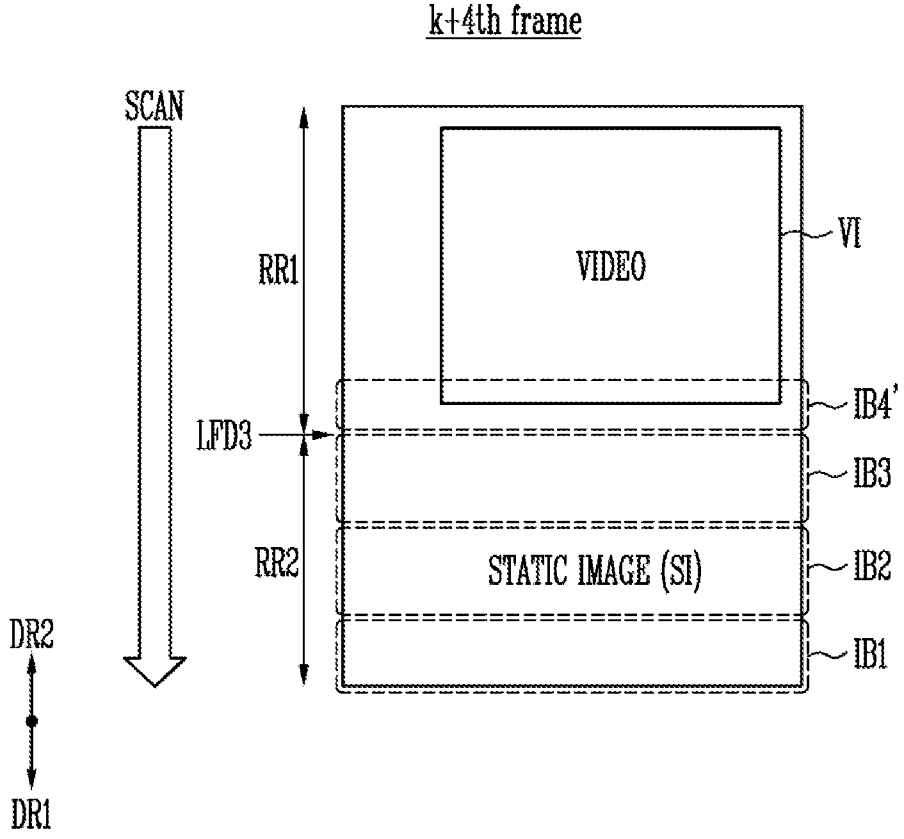
Figure 7F:
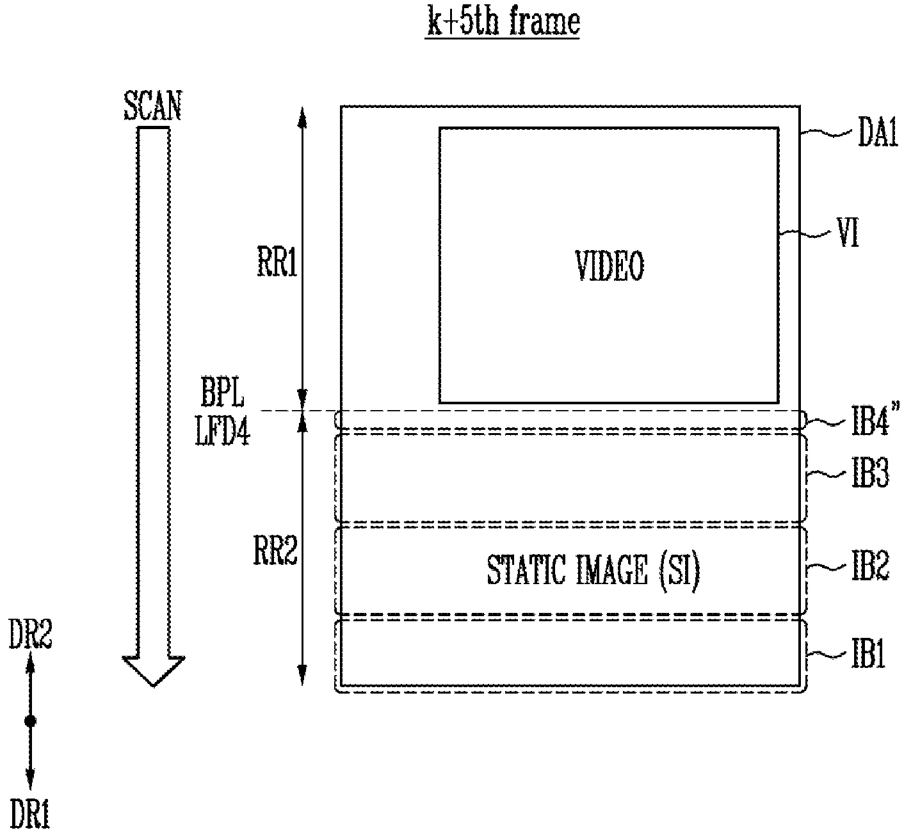

Next, as shown in FIGS. 7E and 7F, the fourth image block IB4 may be reduced (i.e., shown as IB4' and IB4") until no video is included in the fourth image block IB4. The multi-frequency driver 200 may also perform a static image determination on the reduced fourth image block IB4' and IB4". The operation of determining the static image by reducing the image block may be repeated until a boundary between the static image and the video is detected. However, when the reduced image to reduce a burden of a system and the operation has a set or predetermined size or less, the operation for detecting the boundary may be stopped.

According to some example embodiments, when the reduced fourth image block IB4" has less than or equal to the number of pixels rows (e.g., a set or predetermined number of pixel rows), the multi-frequency driver 200 may stop reducing the image block, and determine the top pixel row of the reduced fourth image block IB4" as the boundary pixel row BPL. For example, when the reduced fourth image block IB4" includes 20 or less pixel rows, a reduction of the image block may be stopped.

The multi-frequency driver 200 may output a fourth low frequency driving signal LFD4 corresponding to the boundary pixel row BPL. Accordingly, the last pixel row from the boundary pixel row BPL may be determined as the second area DA2, and be driven at the second refresh rate RR2.

Thus, the boundary between the first area DA1 and the second area DA2 may be detected relatively accurately by the process of FIGS. 7A to 7F. In addition, during the search period for detecting the second area DA2 (and boundary pixel row BPL), a size of the area driven at the second refresh rate RR2 may be gradually increased to the second direction DR2. Therefore, the number of scan lines and/or emission control lines driven at the second refresh rate RR2 may gradually increase during the search period.

Meanwhile, a static image detection and a multi-frequency driving are performed at intervals of 1 frame in FIGS. 7A to 7F, but the static image detection and the multi-frequency driving is not limited thereto. For example, after generating the low frequency driving signal LDF by comparing the image data in the k-th frame, the corresponding area may be driven at the second refresh rate RR2 based on the low frequency driving signal LDF in the k-th frame.

Figure 7G:
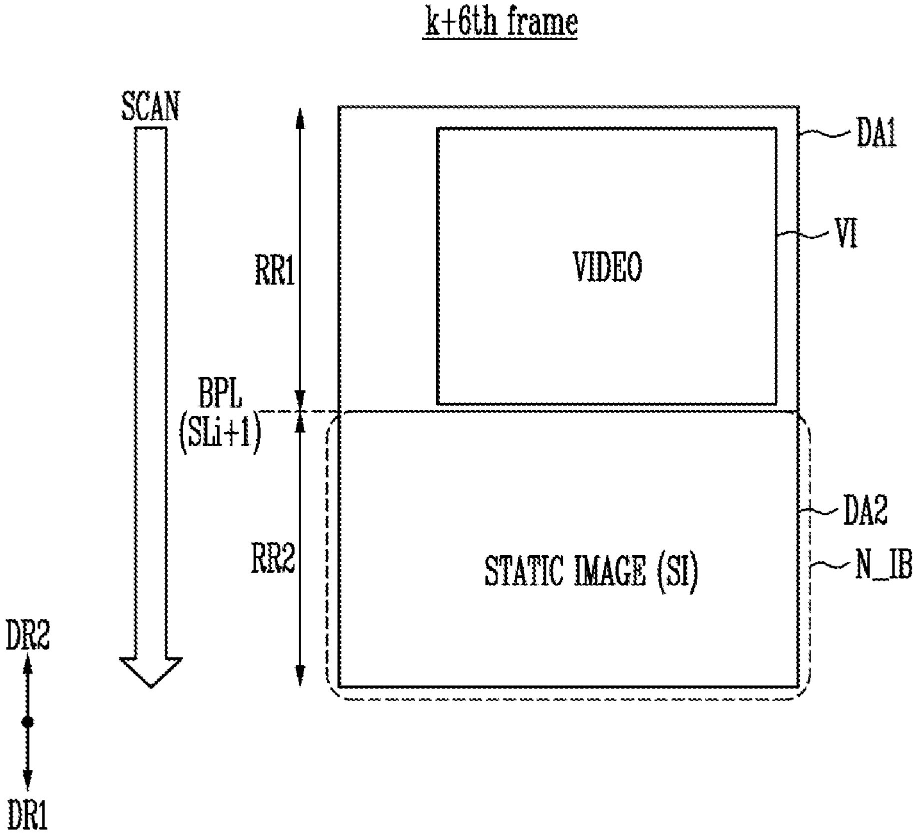

Next, as shown in FIG. 7G, the multi-frequency driver 200 may reset the entire second area to one new image block N_IB and perform a static image determination of the new image block N_IB. Because the static image is monitored by one image block, a usage of a resource for comparing image data may be reduced, and a sensing of an image change in the new image block N_IB may be easy.

Figure 7H:
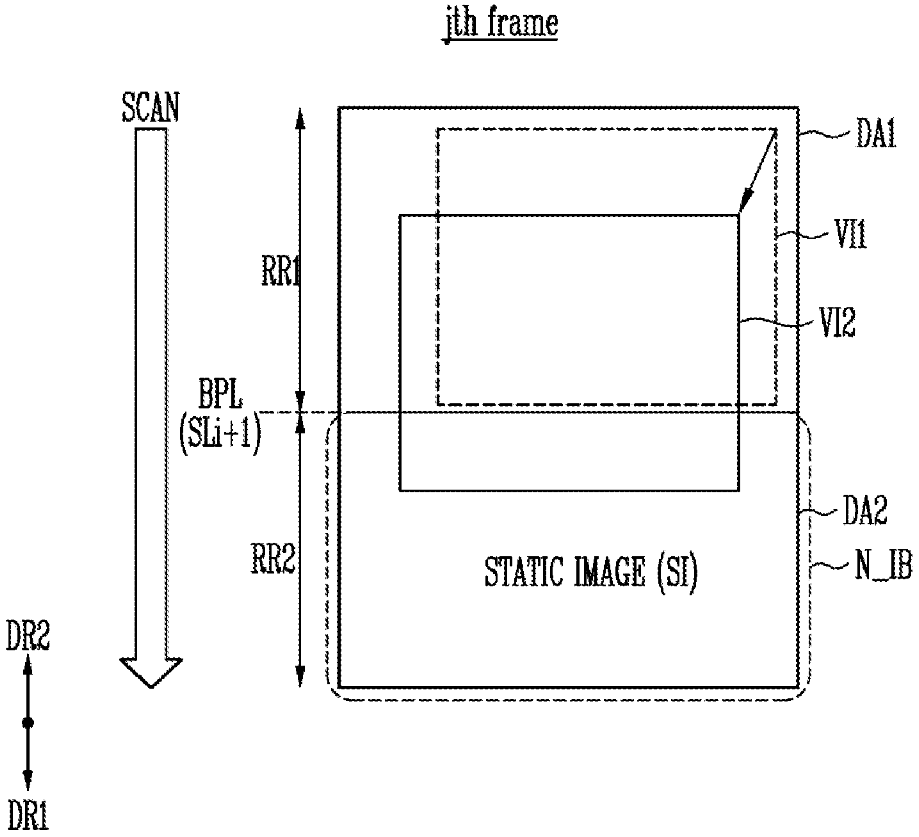
Figure 7I:
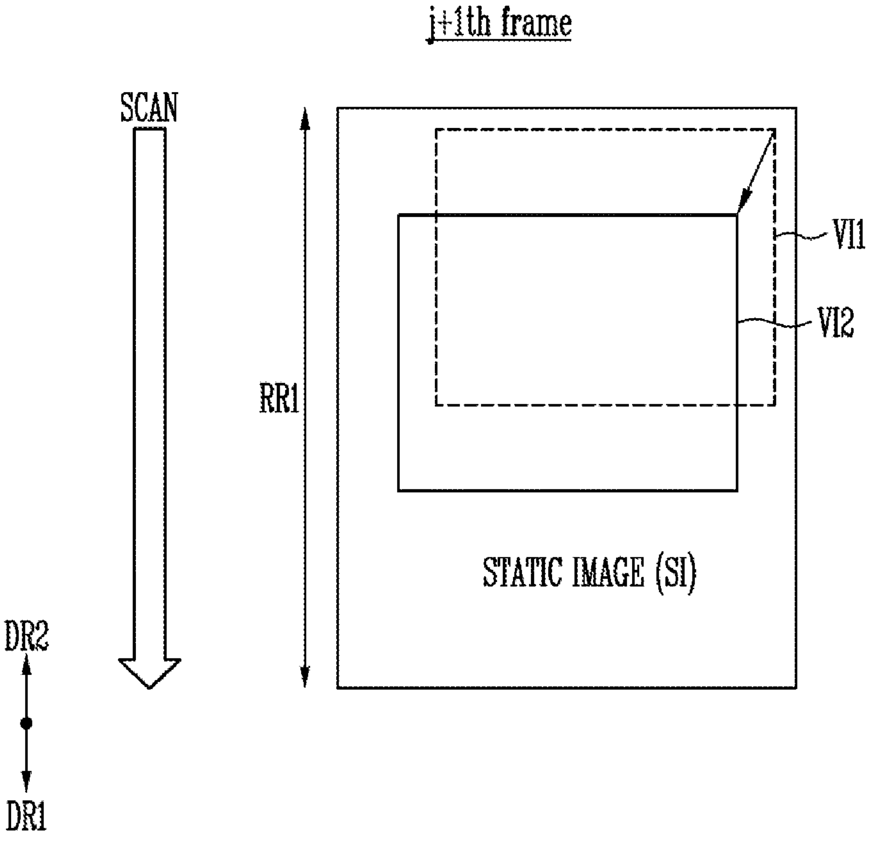

Next, as shown in FIG. 7H, an image change event in which an image of the second area DA2 is changed may occur in the j-th frame (where j is a natural number). For example, a position of a video may be changed (from VI1 to VI2) or a size of a video may be changed. Alternatively, an image of the second area DA2 may be changed by a touch of the user. In this case, as shown in FIG. 7I, the multi-frequency driver 200 may generate the initialization signal to provide it to the timing controller 300 and/or the scan driver 400. The initialization signal may include a command to initialize (or delete) the position of the boundary pixel row BPL and the second area DA2.

Accordingly, the scan driver 400 may supply the scan signal to the scan lines SL1 to SLn at the first refresh rate RR1 in response to the initialization signal. That is, the entire pixel unit 100 may be driven at the first refresh rate RR1.

Next, the operation of FIG. 7A may be resumed.

As described above, the display device 1000 and its driving method according to some example embodiments of the present invention may perform image data comparison in real time without configuration of a frame memory and the like and may detect an optimal or desired boundary pixel row BPL between the first area DA1 and the second area DA2 while gradually increasing an area to which the second refresh rate RR2 is applied for a short time. Accordingly, power consumption for driving at a multiple frequency (or multiple refresh rate) may be minimized without increasing a cost for detecting the boundary pixel row detection.

Figure 8:
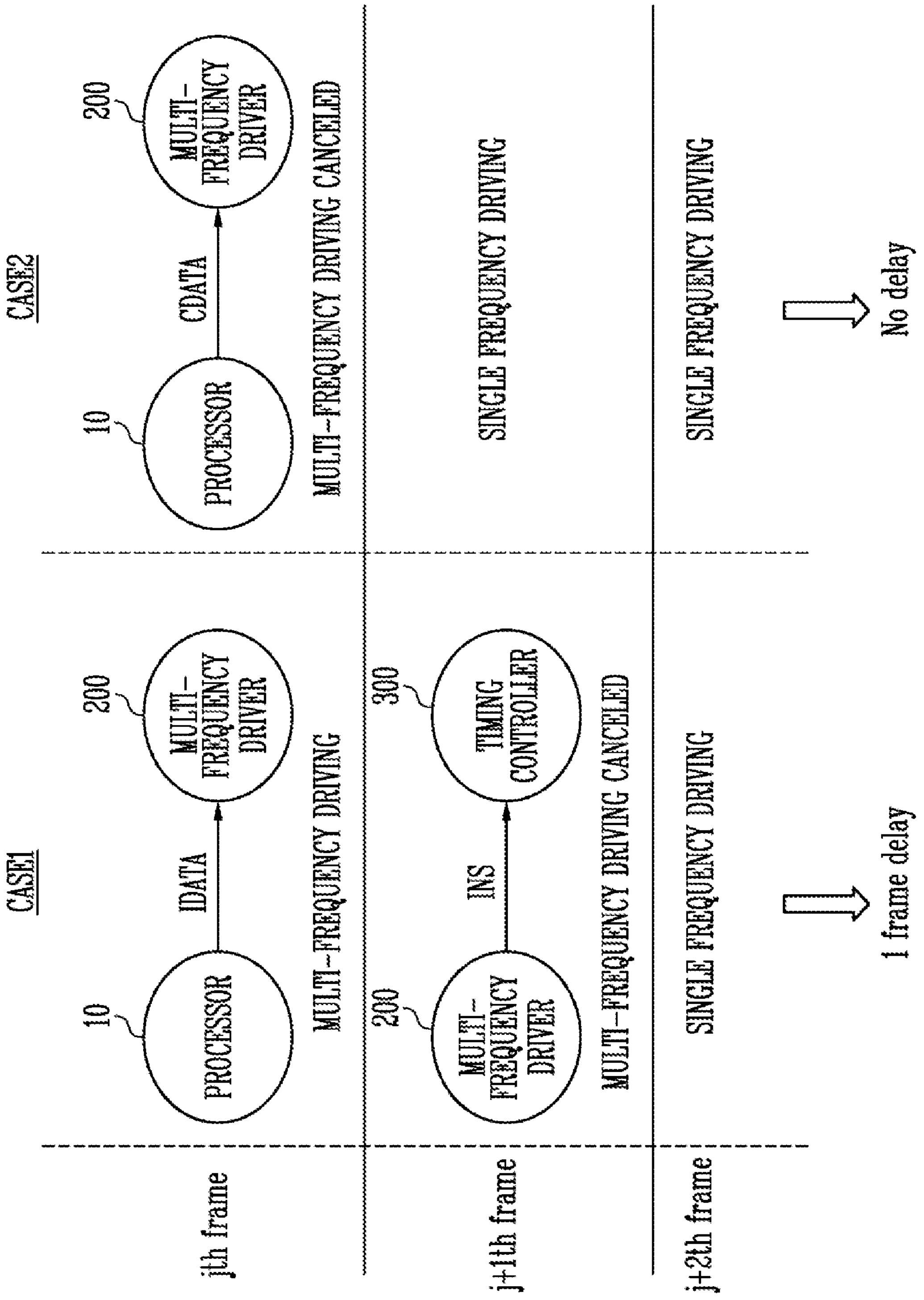
FIG. 8 is a drawing showing an example of an operation of a display device of FIG. 1.

FIG. 8 is a drawing showing an example of an operation of a display device of FIG. 1.

Referring to FIGS. 1, 7H, 7I and 8, when the image change event of the second area DA2 occurs, the display device 1000 may be driven at a single frequency by escaping the multi-frequency driving.

A first case CASE1 shows an example embodiment in which the display device is driven at a single frequency by the driving of FIGS. 7H and 7I. That is, when an image change event of the second area DA2 occurs in the j-th frame, a single frequency driving may be delayed by one frame or more by a static image determination operation of the multi-frequency driver 200 in the j+1-th frame.

According to some example embodiments, when the image change event of the second area DA2 occurs, the processor 10 may provide a command signal which command to drive immediately at a single frequency to the multi-frequency driver 200 and/or the timing controller 300. For example, when an image change event of the second area DA2 occurs in the j-th frame, the pixel unit 100 may be driven at a single frequency (single refresh rate) in the j+1-th frame.

According to some example embodiments, when the image change event of the second area DA2 occurs in the j-th frame, the processor 10 may change the image data corresponding to the second area DA2 in the j-th frame, and may supply the changed image data CDAA to the multi-frequency driver 200 (in a second case CASE2). For example, the processor 10 may change image data of one pixel included in the last pixel row. Accordingly, the multi-frequency driver 200 may detect a change of image data of the second area DA2. The multi-frequency driver 200 may output an initialization signal (shown as INS in FIG. 5) In the j-th frame, and the pixel unit 100 may be driven at a single frequency in the j+1-th frame.

Therefore, the single frequency driving may be performed without delay, and an image quality may be improved when switching from the multi frequency driving to the single frequency driving.

Figure 9:
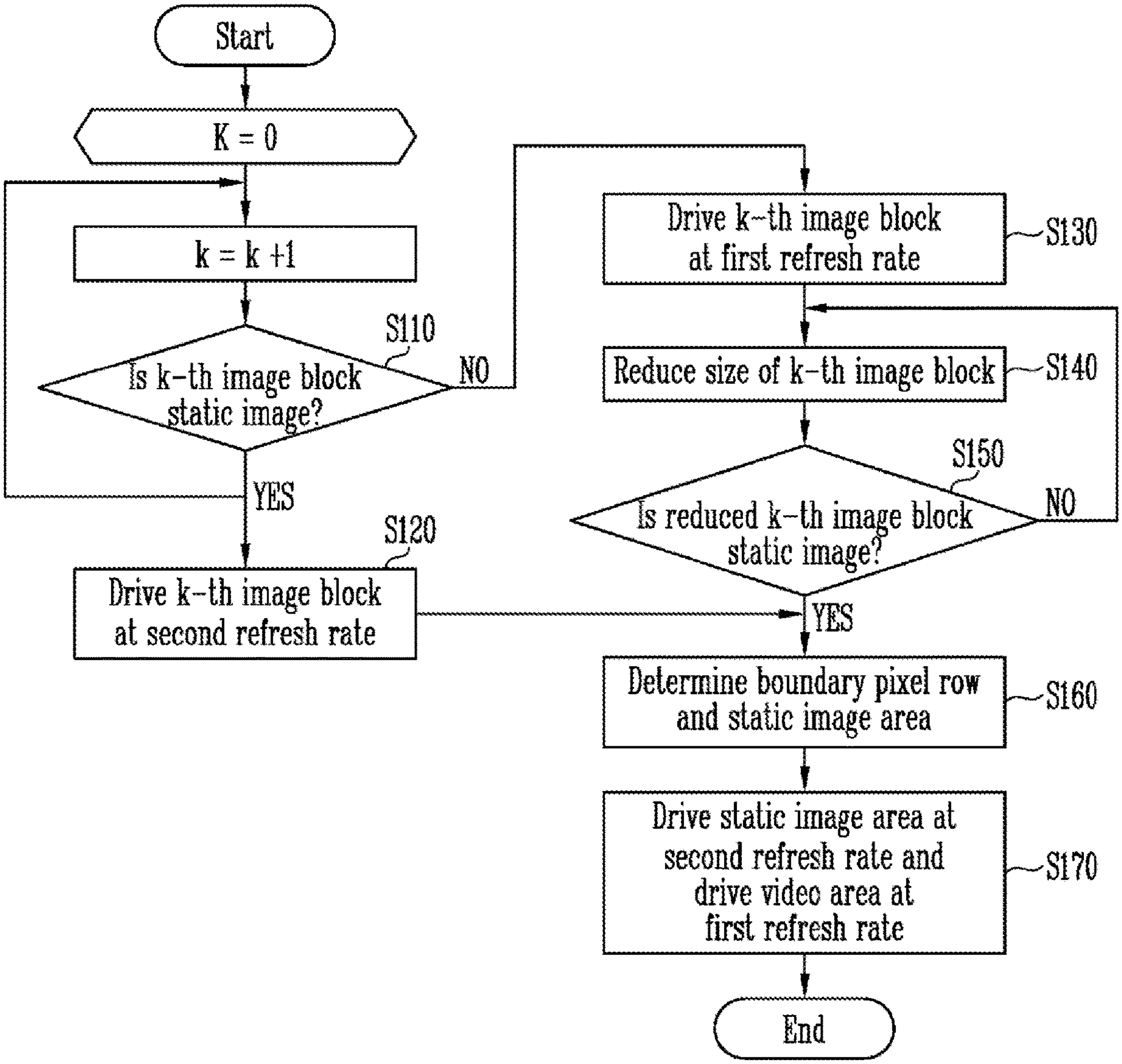
FIG. 9 is a flowchart showing a driving method of a display device according to some example embodiments of the present invention.

FIG. 9 is a flowchart showing a driving method of a display device according to some example embodiments of the present invention.

Referring to FIG. 9, a driving method of the display device may determine whether or not the first image block is a static image by comparing the image data of the previous image frame of the first image block with the image data of the current image frame of the first image block 9 (S110). When the first image block is not a static image, the first image block may be driven at the first refresh rate (S130), and a size of the first image block may be reduced in the first direction (S140). Next, one of the pixel rows included in the reduced first image block may be determined as the boundary pixel row, and a static image area included in the boundary pixel row may be determined (S160).

The boundary pixel row may be a pixel row separating the static image area and a video area.

When the first image block is a static image, the first image block may be driven at the second refresh rate lower than the first refresh rate (S120). In this case, whether or not the second image block adjacent to the first image block in a reverse direction of the first direction is a static image may be determined again (S110).

According to some example embodiments, when the static image area is determined, the static image area may be driven at the second refresh rate, and the video area may be driven at the first refresh rate (S170). The static image area may include an area from the boundary pixel row to the last pixel row.

According to some example embodiments, a size of an area driven at the second refresh rate may be gradually increased during the search period for determining the boundary pixel row.

Because the driving method of the display device including the operations S110 to S170 and an effect thereof are shown in and the effect is described in detail with reference to FIGS. 1 to 7F, redundant descriptions will be omitted.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

While aspects of some example embodiments of the invention are described with reference to the attached drawings, it will be understood by those skilled in the art that various changes in form and details may be made therein without departing from the spirit and scope of the invention as defined by the appended claims, and their equivalents.

What is claimed is:

1. A display device comprising:

a pixel unit including a plurality of pixels connected to a plurality of scan lines and a plurality of data lines;

a multi-frequency driver configured to compare image data between adjacent frames to determine a first area of the pixel unit driven at a first refresh rate and a second area of the pixel unit driven at a second refresh rate lower than the first refresh rate;

a scan driver configured to sequentially supply scan signals to the plurality of scan lines in a first direction, to supply first scan signals of the scan signals to the first area at the first refresh rate, and to supply second scan signals of the scan signals to the second area at the second refresh rate; and a data driver configured to supply a data signal corresponding to the image data to the plurality of data lines, wherein the multi-frequency driver is configured to determine whether or not the image data is a static image, to gradually increase a size of the second area of the pixel unit driven at the second refresh rate in a second direction opposite the first direction, and to reduce a size of the second area by changing a position of a top pixel row of the image data with respect to the first direction based on the image data being determined to not be the static image during a search period, wherein the second area comprises a plurality of image blocks, wherein the multi-frequency driver comprises:

a block controller configured to determine a size, a number, and a position of an image block among the plurality of image blocks in which it is to be determined whether or not the image block is a static image; and an image analyzer configured to determine whether or not the image block is a static image, wherein the image block includes a plurality of pixel rows, wherein the block controller is configured to reduce the size of the image block by reducing a number of pixel rows included in the image block, wherein the multi-frequency driver is configured to determine a boundary pixel row, which is a top pixel row of the second area, based on results of comparing the image data during a plurality of frames, wherein the block controller and the multi-frequency driver are configured to repeat comparing the image data by reducing the size of the image block until the static image is detected, and wherein the image analyzer comprises:

a checksum calculator configured to calculate a first checksum of the image data of a previous frame of the image block, and to calculate a second checksum of the image data of a current frame of the image block; and a comparator configured to compare a least significant bit of the first checksum and a least significant bit of the second checksum.

2. The display device of claim 1, wherein the scan driver is configured to supply the scan signals from the boundary pixel row to a last pixel row at the second refresh rate.

3. The display device of claim 1, wherein the multi-frequency driver is configured to gradually increase the size of the second area driven at the second refresh rate in the second direction opposite to the first direction during the search period for determining the boundary pixel row based on a video being displayed on a portion of the pixel unit.

4. The display device of claim 3, wherein the scan driver is configured to gradually increase a number of the plurality of scan lines driven at the second refresh rate during the search period in response to a command of the multi-frequency driver.

5. The display device of claim 1, wherein the first area includes a video, and an image displayed in the second area is a static image.

6. The display device of claim 1, further comprising:

a timing controller configured to supply first image data corresponding to the first area to the data driver at the first refresh rate, and to supply second image data corresponding to the second area to the data driver at the second refresh rate; and a processor configured to change and supply to the multi-frequency driver some of the second image data when an image change event of the second area occurs.

7. The display device of claim 1, wherein the data driver is configured to supply a data signal corresponding to the first area to the pixel unit at the first refresh rate, and to supply a data signal corresponding to the second area to the pixel unit at the second refresh rate.

8. A display device comprising:

a pixel unit including a plurality of pixels connected to a plurality of scan lines and a plurality of data lines;

a multi-frequency driver configured to compare image data between adjacent frames to determine a first area of the pixel unit driven at a first refresh rate and a second area of the pixel unit driven at a second refresh rate lower than the first refresh rate;

a scan driver configured to sequentially supply scan signals to the plurality of scan lines in a first direction, to supply first scan signals of the scan signals to the first area at the first refresh rate, and to supply second scan signals of the scan signals to the second area at the second refresh rate; and a data driver configured to supply a data signal corresponding to the image data to the plurality of data lines, wherein the multi-frequency driver comprises:

an image analyzer configured to compare image data of a previous frame of an image block included in the pixel unit with image data of a current frame of the image block to determine whether or not the image block is a static image;

a block controller configured to determine a size, a number, and a position of the image block in which it is to be determined whether or not the image block is a static image; and a frequency controller configured to apply the second refresh rate to the image block determined as the static image, wherein the second area comprises a plurality of image blocks, wherein at least one image block among the plurality of image blocks includes a plurality of pixel rows, and wherein the block controller is configured to reduce a size of the image block by reducing a number of pixel rows included in the image block, and changing a position of a top pixel row of the image block with respect to the first direction based on the image block being determined to not be the static image, wherein the multi-frequency driver is configured to determine a boundary pixel row, which is a top pixel row of the second area, based on results of comparing the image data during a plurality of frames without using a frame memory, wherein the block controller and the image analyzer are configured to repeat comparing the image data by reducing the size of the image block until the static image is detected, and wherein the image analyzer comprises:

a checksum calculator configured to calculate a first checksum of the image data of the previous frame of the image block, and to calculate a second checksum of the image data of the current frame of the image block; and a comparator configured to compare a least significant bit of the first checksum and a least significant bit of the second checksum.

9. The display device of claim 8, wherein the image analyzer is configured to determine whether or not each of a first image block and a second image block adjacent to the first image block is a static image based on the first image block being determined to be the static image.

10. The display device of claim 9, wherein the frequency controller is configured to extend a portion of the pixel unit to which the second refresh rate is applied in a second direction opposite to the first direction, in response to a number of image blocks determined to be the static image.

11. The display device of claim 8, wherein the image analyzer is configured to determine whether or not the reduced image block is a static image based on the image block being determined to not be the static image.

12. The display device of claim 8, wherein the block controller is configured to determine one of a plurality of pixel rows included in the reduced image block as the boundary pixel row which is the top pixel row of the second area, and to determine the second area including the boundary pixel row based on a size of the image block being reduced to less than or equal to a predetermined number of pixel rows.

13. The display device of claim 12, wherein the frequency controller is configured to output an initialization signal to initialize the second area and the boundary pixel row based on image data of the second area being changed.

14. The display device of claim 13, wherein the scan driver is configured to supply the scan signals to the plurality of scan lines at the first refresh rate in response to the initialization signal.

15. A driving method of a display device comprising:

determining a size, a number, and a position of a first image block in which it is to be determined whether or not the first image block is a static image;

comparing image data of a previous frame of the first image block with image data of a current frame of the first image block to determine whether or not the first image block is a static image;

driving the first image block at a first refresh rate by supplying scan signals to a plurality of scan lines of the first image block at a first frequency corresponding to the first refresh rate and reducing a size of the first image block in a first direction by reducing a number of pixel rows included in the first image block, when the first image block is not a static image;

determining one of a plurality of pixel rows included in the reduced first image block to be a boundary pixel row between a static image area and a video area without using a frame memory, and determining the static image area including the boundary pixel row; and driving the first image block at a second refresh rate lower than the first refresh rate by supplying the scan signals to the plurality of scan lines of the first image block at a second frequency corresponding to the second refresh rate, when the first image block is a static image, wherein the determining the static image area further comprises:

driving the static image area at the second refresh rate and driving the video area at the first refresh rate, wherein the video area is a first area, and the static image area is a second area, and wherein the static image area includes an area from the boundary pixel row to a last pixel row, wherein a size of an area driven at the second refresh rate gradually increases in a second direction opposite the first direction during a search period for determining the boundary pixel row, wherein the second area comprises a plurality of image blocks, wherein the first image block among the plurality of image blocks includes a plurality of pixel rows, wherein the comparing the image data is repeated by reducing the size of the first image block in the first direction until the static image is detected, and wherein the comparing the image data comprises:

calculating a first checksum of the image data of the previous frame of the first image block, and calculating a second checksum of the image data of the current frame of the first image block; and comparing a least significant bit of the first checksum and a least significant bit of the second checksum.

* * * * *